United States Patent
Cross

(10) Patent No.: US 6,249,444 B1
(45) Date of Patent: Jun. 19, 2001

(54) OFFSET RESONANT ZVS FORWARD CONVERTER

(75) Inventor: David A. Cross, Wrestlingworth (GB)

(73) Assignee: Astec International Limited, Hong Kong (HK)

(*) Notice: Subject to any disclaimer, the term of this patent is extended or adjusted under 35 U.S.C. 154(b) by 0 days.

(21) Appl. No.: 09/430,930

(22) Filed: Nov. 1, 1999

(51) Int. Cl.[7] .................................................. H02M 3/335
(52) U.S. Cl. .............................. 363/21; 363/97; 363/131
(58) Field of Search ................................. 363/16, 20, 21, 363/95, 97, 98, 131

(56) References Cited

U.S. PATENT DOCUMENTS

| | | | | |
|---|---|---|---|---|
| 4,975,821 | * | 12/1990 | Lethellier | 363/21 |
| 5,490,052 | * | 2/1996 | Yoshida et al. | 363/15 |
| 5,502,628 | * | 3/1996 | Arakawa | 363/20 |
| 5,652,700 | * | 7/1997 | Tsai et al. | 363/21 |
| 5,870,299 | * | 2/1999 | Rozman | 363/127 |
| 6,028,776 | * | 2/2000 | Ji et al. | 363/21 |

OTHER PUBLICATIONS

Hua, G. C. et al.; "Novel Zero–Voltage–Transition PWM Converters"; pp. 33–39, Bradley Dept. of Electrical Engineering, Virginia Polytechnic Inst. and State Univ., Blacksburg, VA. "No Date".

* cited by examiner

Primary Examiner—Adolf Deneke Berhane
(74) Attorney, Agent, or Firm—Coudert Brothers

(57) ABSTRACT

A forward converter circuit that includes elements capable of generating a zero volt switching (ZVS) signal across the power switch. The ZVS generating elements include a series combination of a switch and shunt inductance, which are connected in parallel across the primary winding of the power transformer. An offset capacitor is placed in series with the shunt inductance and is operated in conjunction with a control circuit to couple the magnetizing current from the primary winding of the power transformer and use it to charge the offset capacitor. This provides zero volt switching of the power switch at turn-on and turn-off, and reset of the core of the power transformer without the use of a tertiary winding. The circuit also achieves added protection of the power switch without the use of an active clamp.

30 Claims, 16 Drawing Sheets

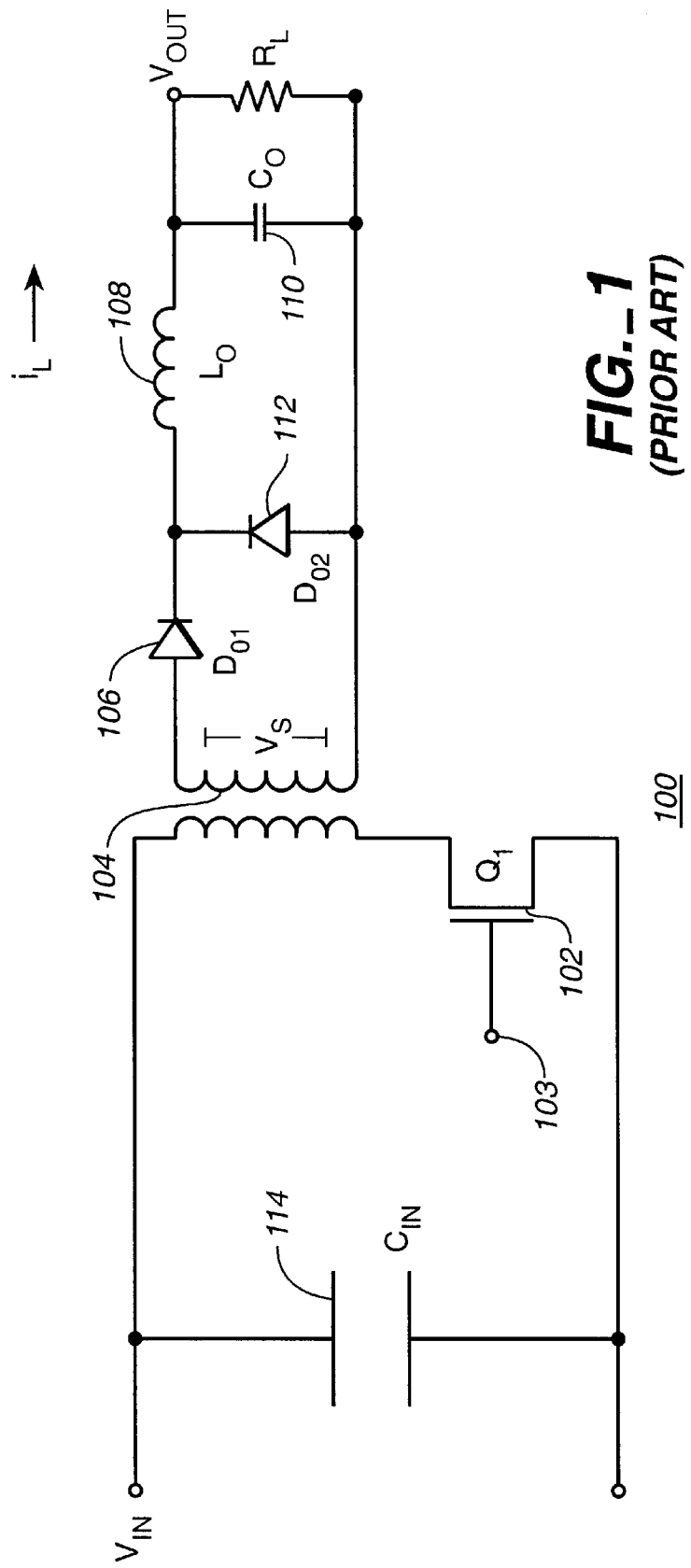
FIG._1
*(PRIOR ART)*

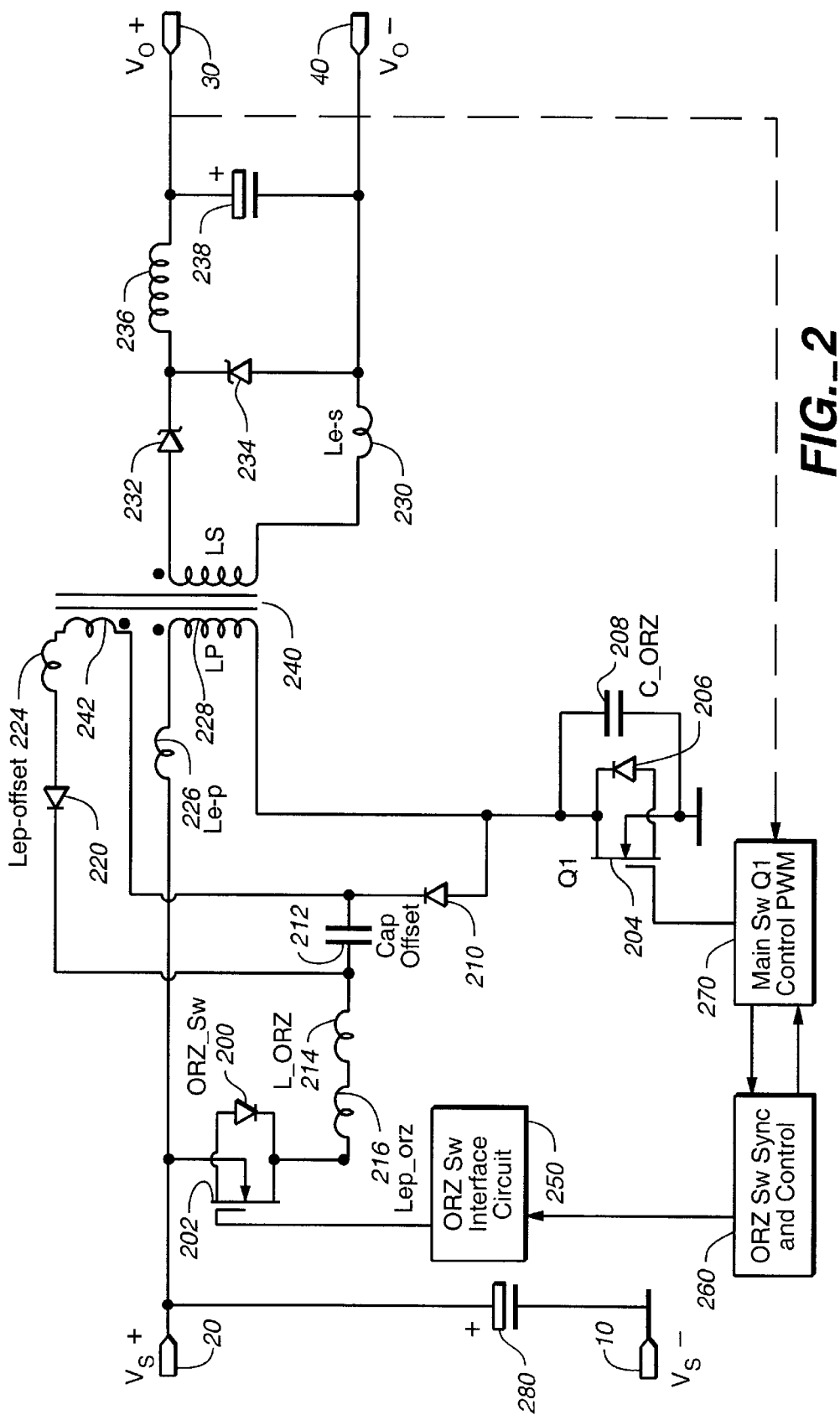
FIG._2

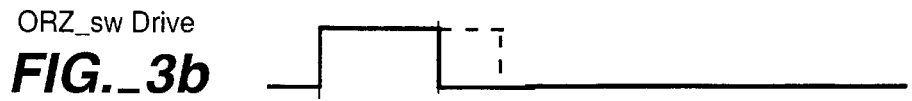
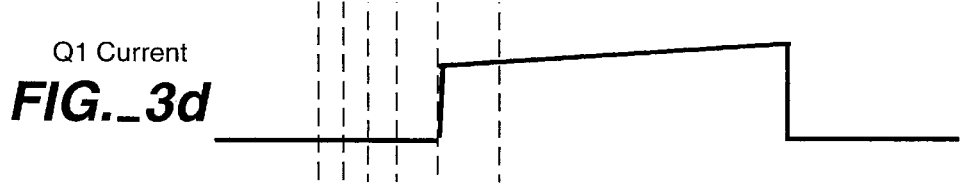
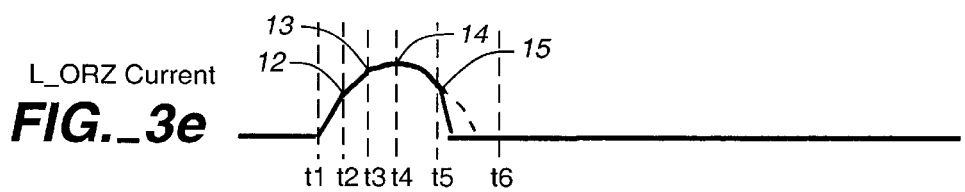
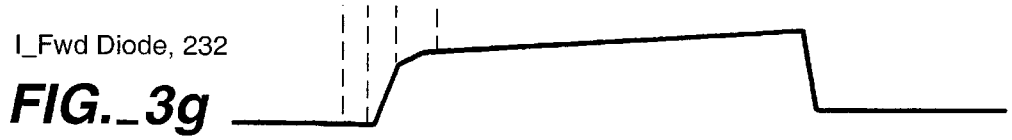

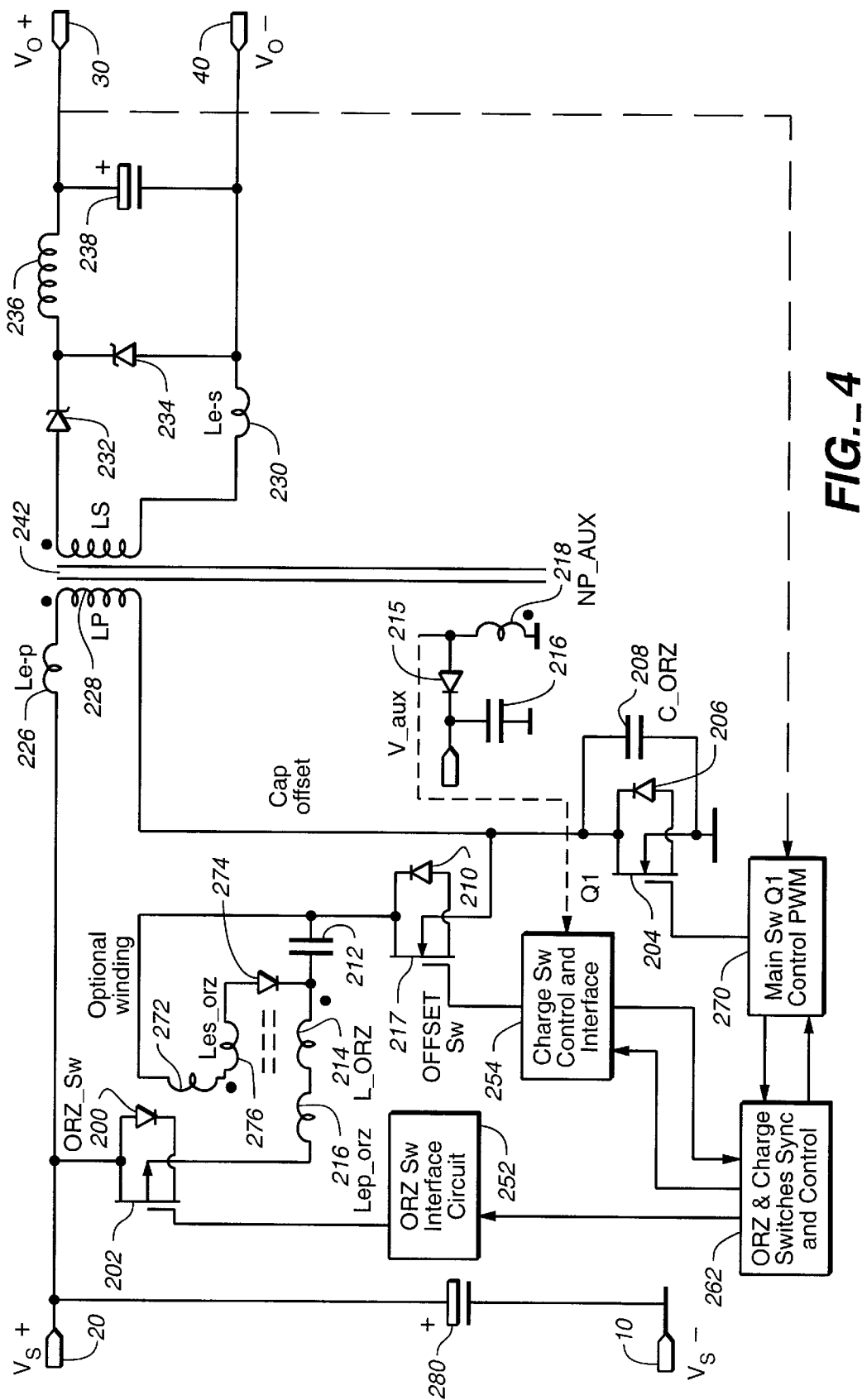
FIG._4

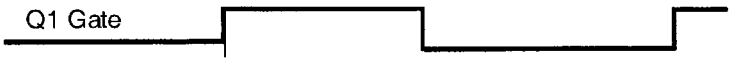

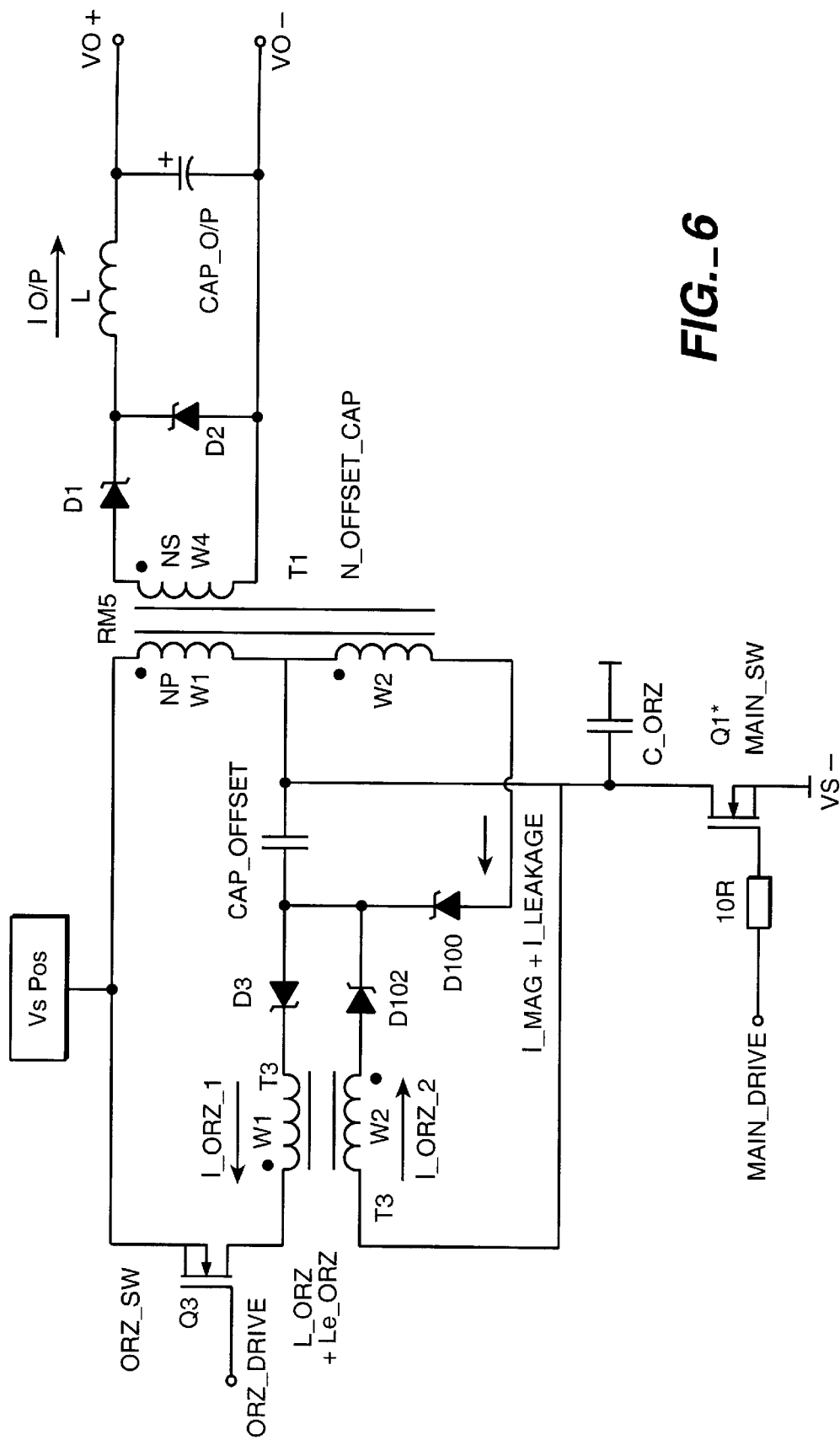
FIG._6

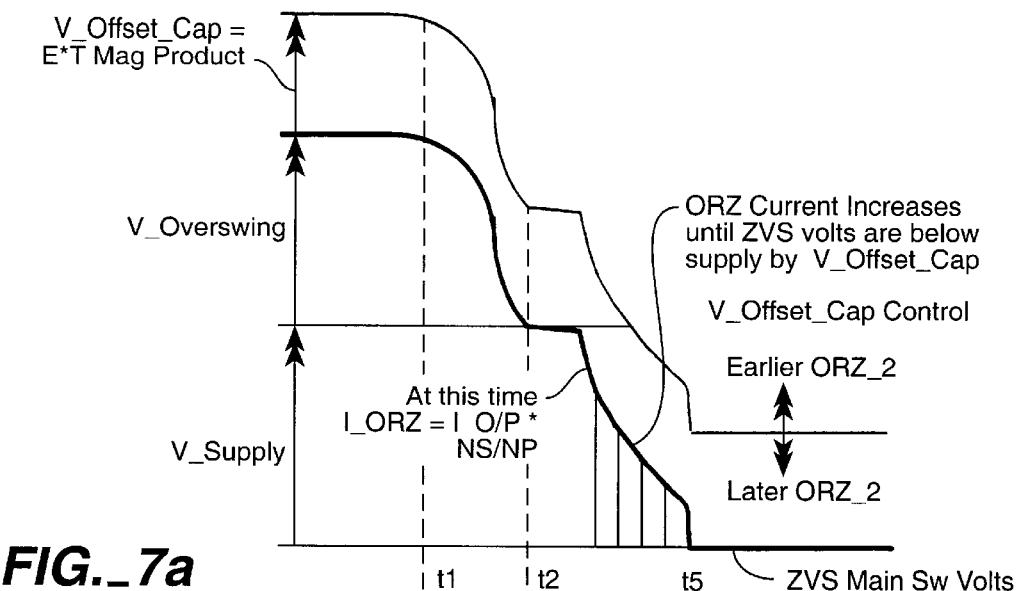
FIG._7a
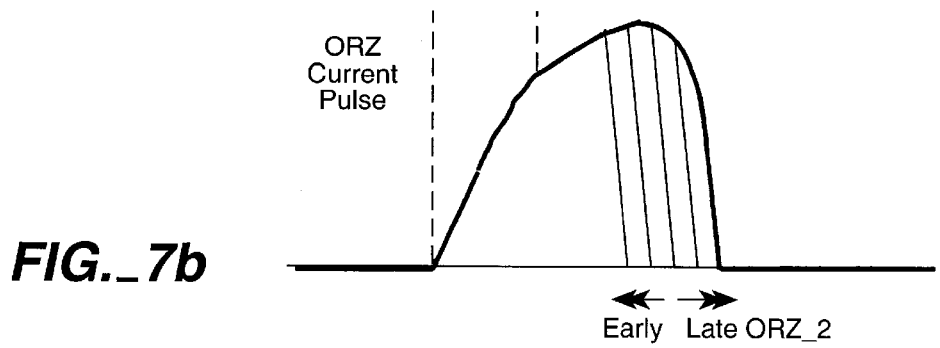
FIG._7b
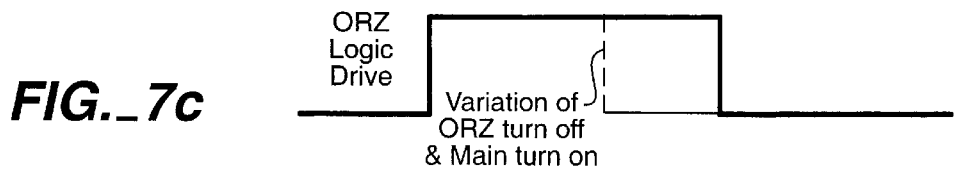
FIG._7c
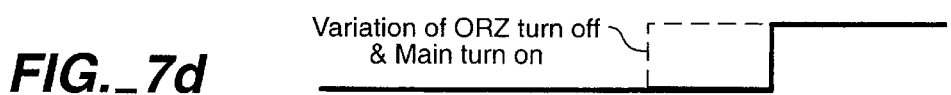
FIG._7d

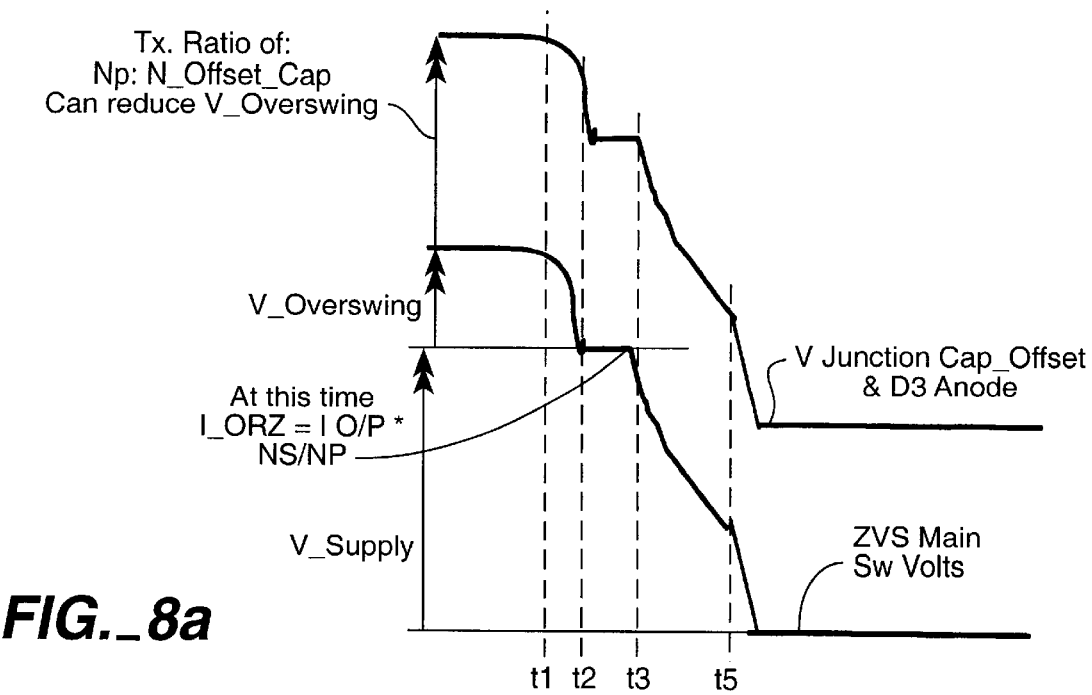
FIG._8a
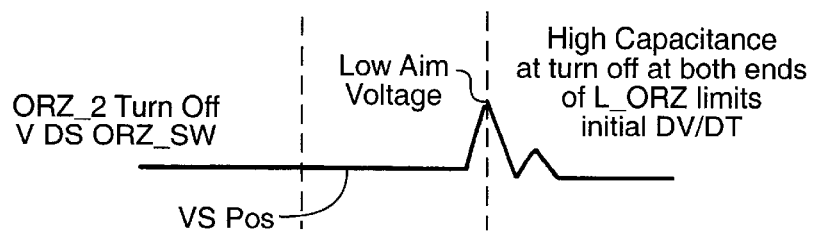
FIG._8b
FIG._8c ORZ Current Pulse
FIG._8d ORZ Logic Drive
FIG. 8e Main Drive

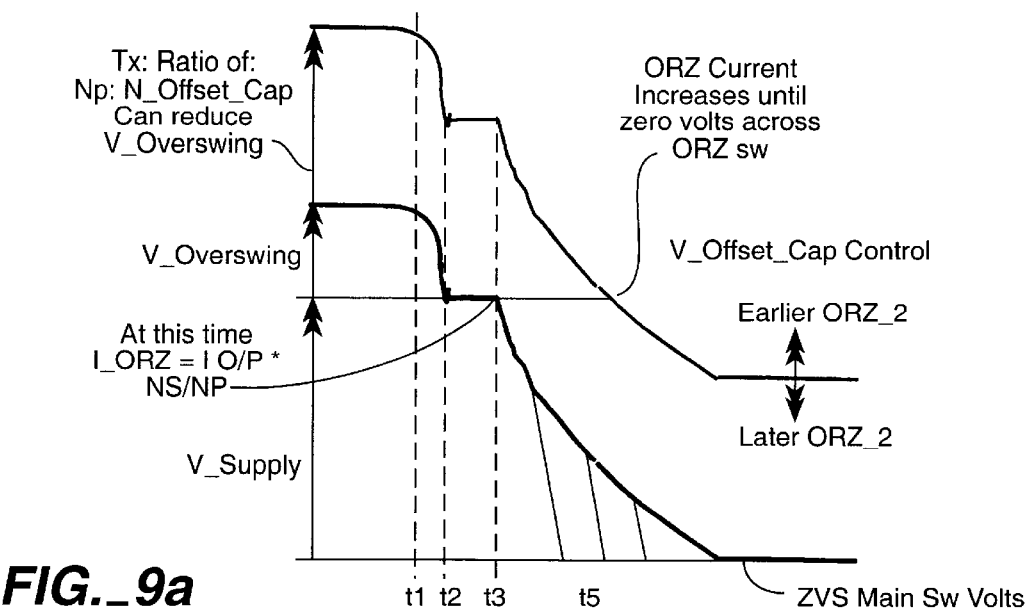
FIG._9a
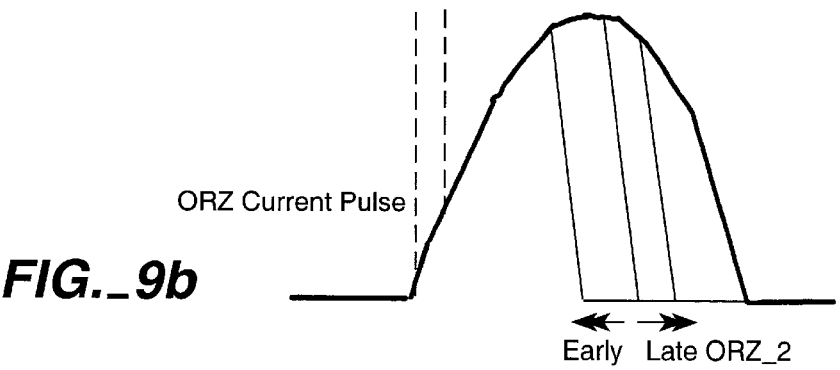
FIG._9b
FIG._9c
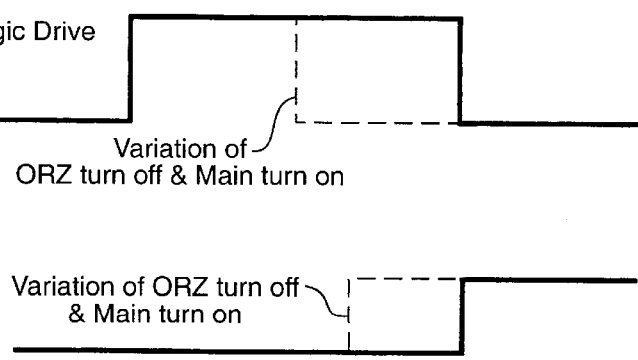
FIG._9d

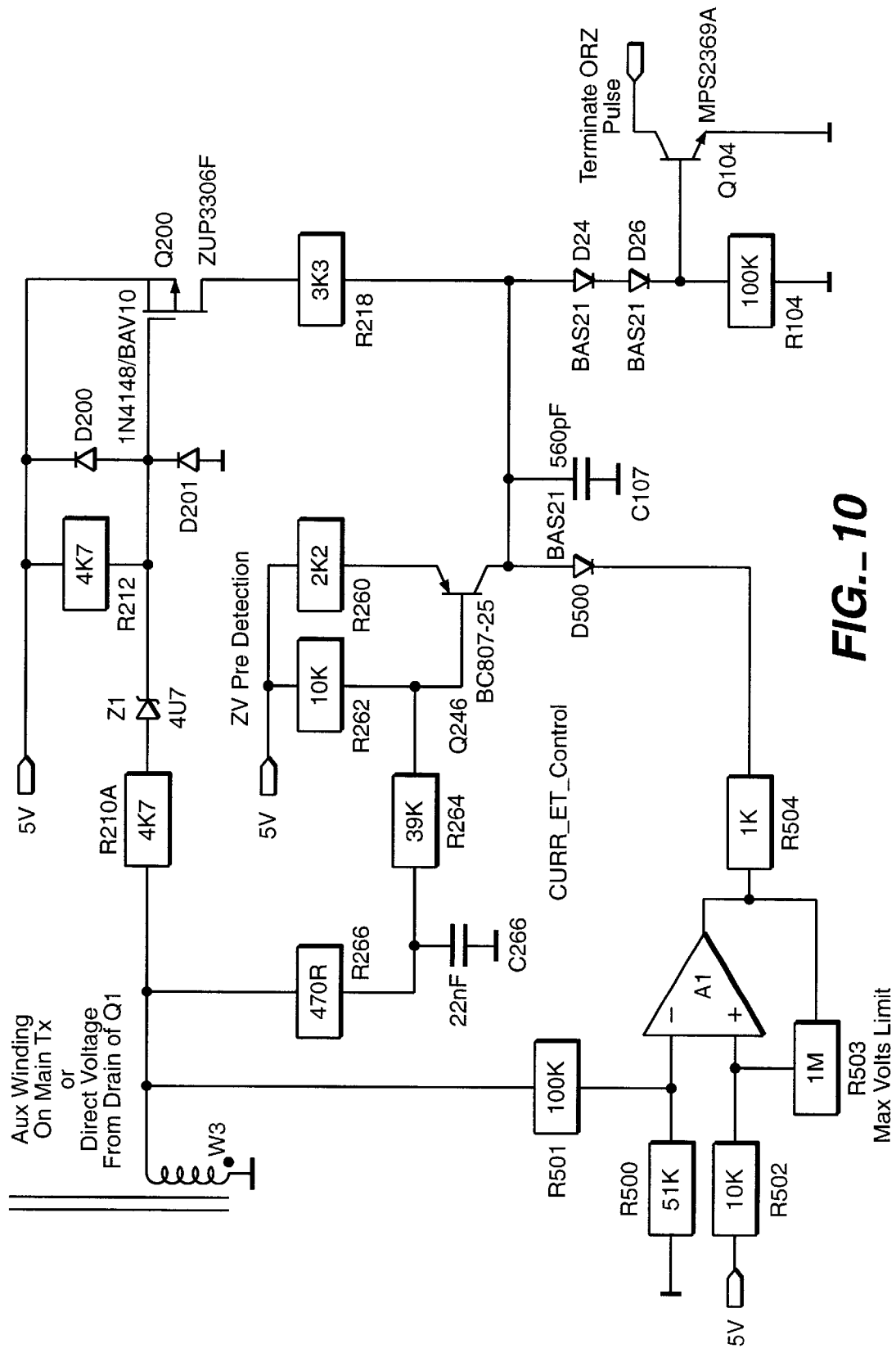
FIG._10

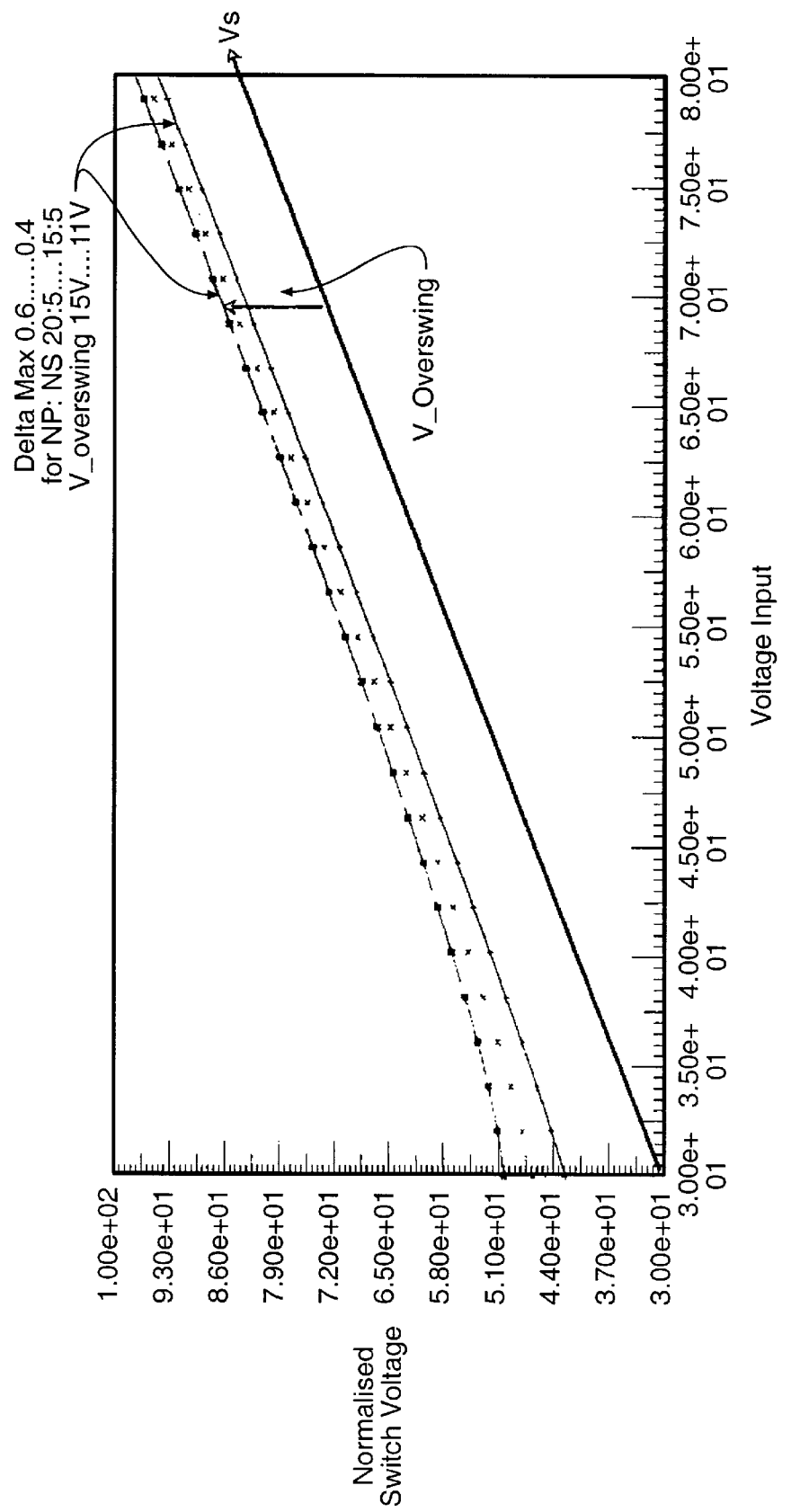
FIG._11

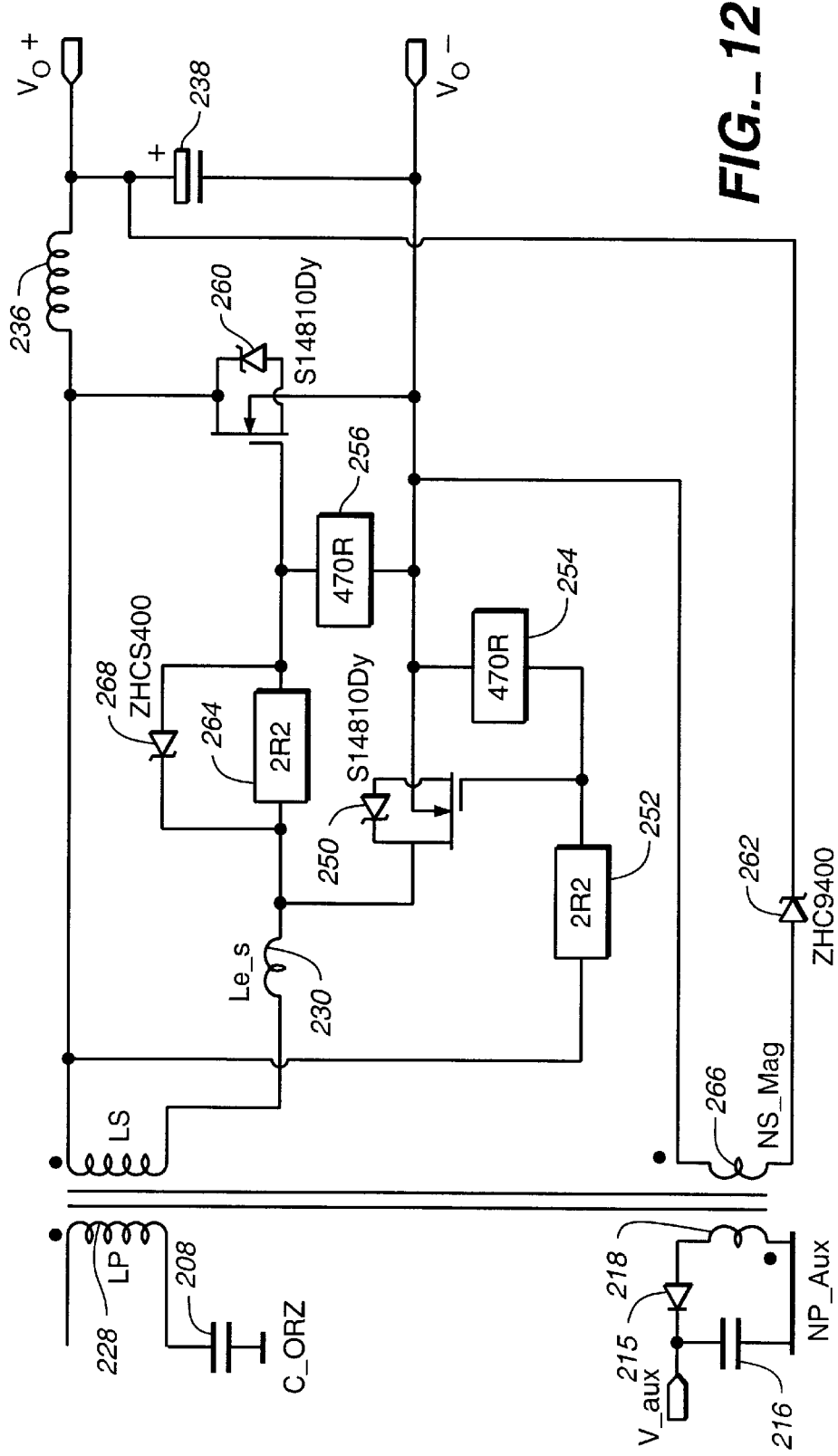
FIG._12

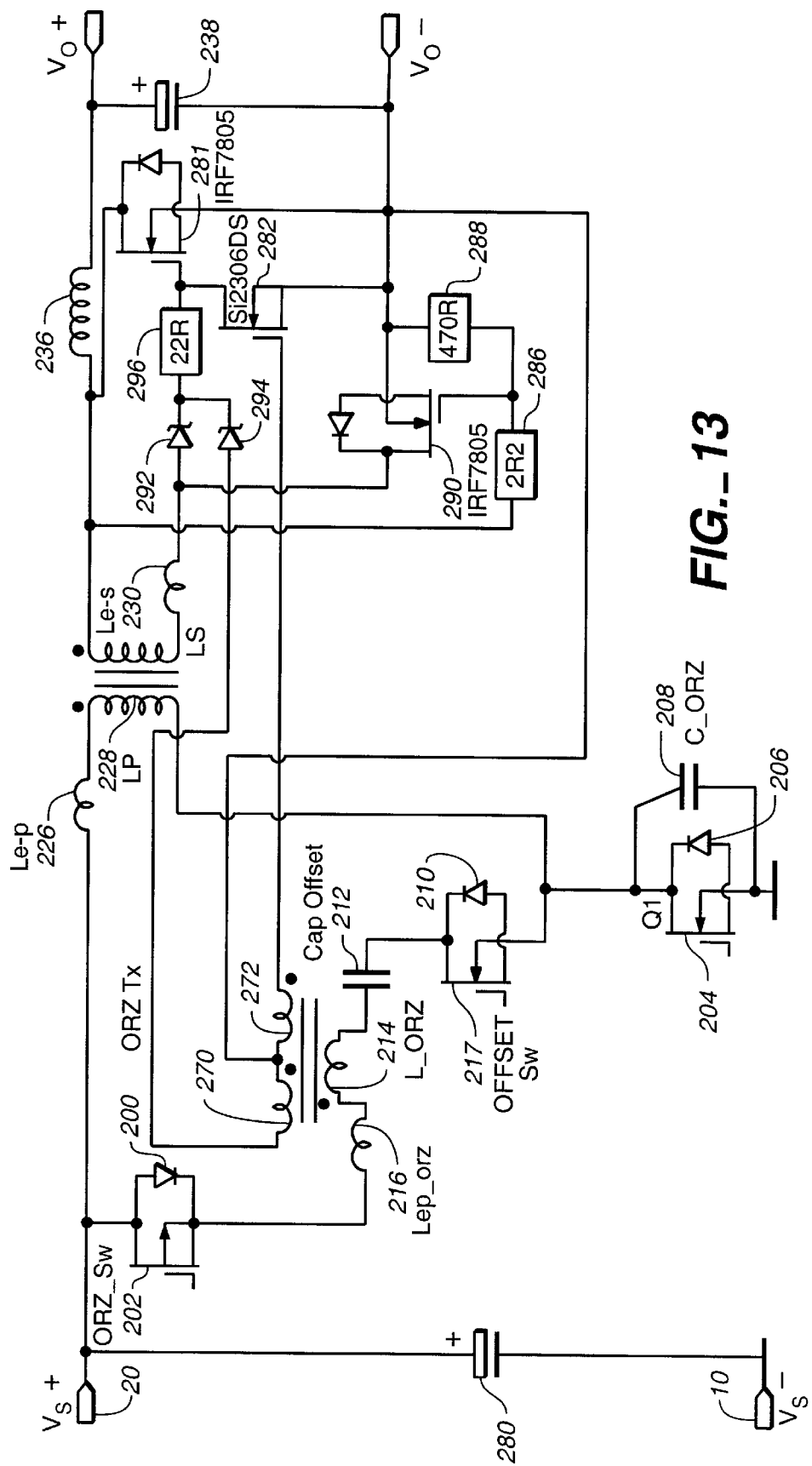
FIG._13

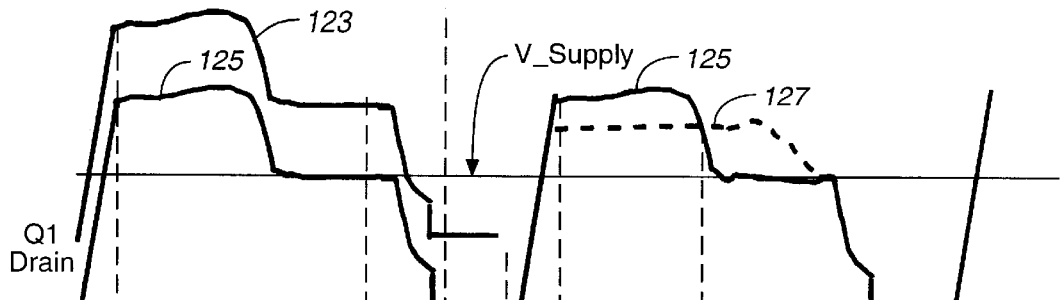
FIG._13a
FIG._13b
FIG._13c
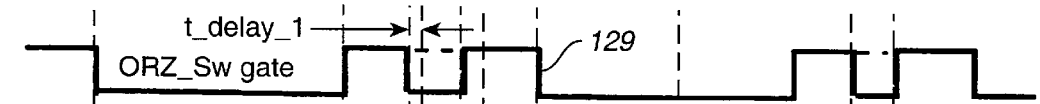
FIG._13d
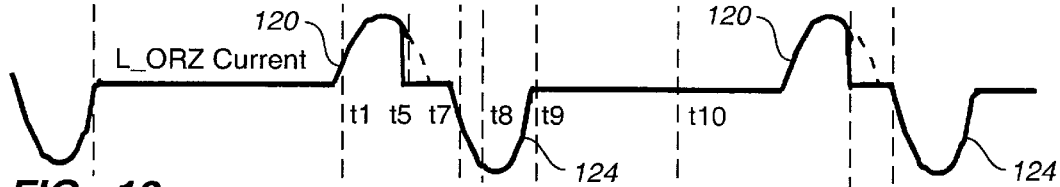
FIG.-13e
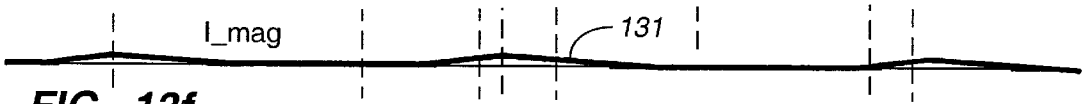
FIG._13f
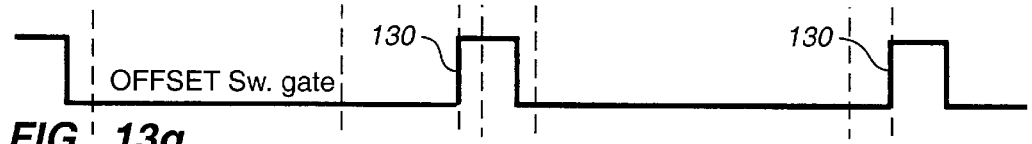
FIG._13g
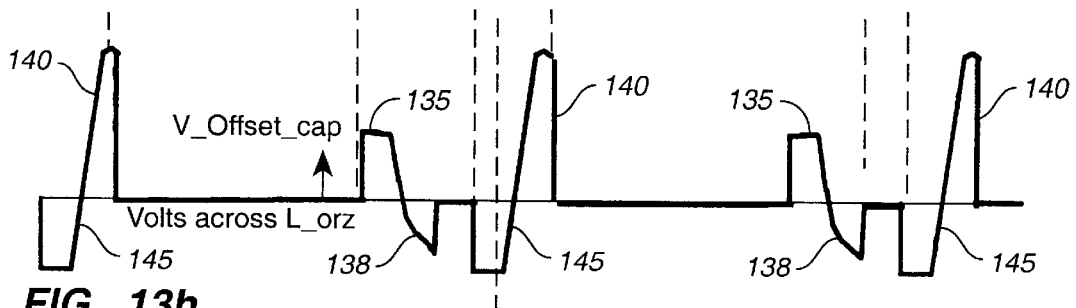
FIG._13h

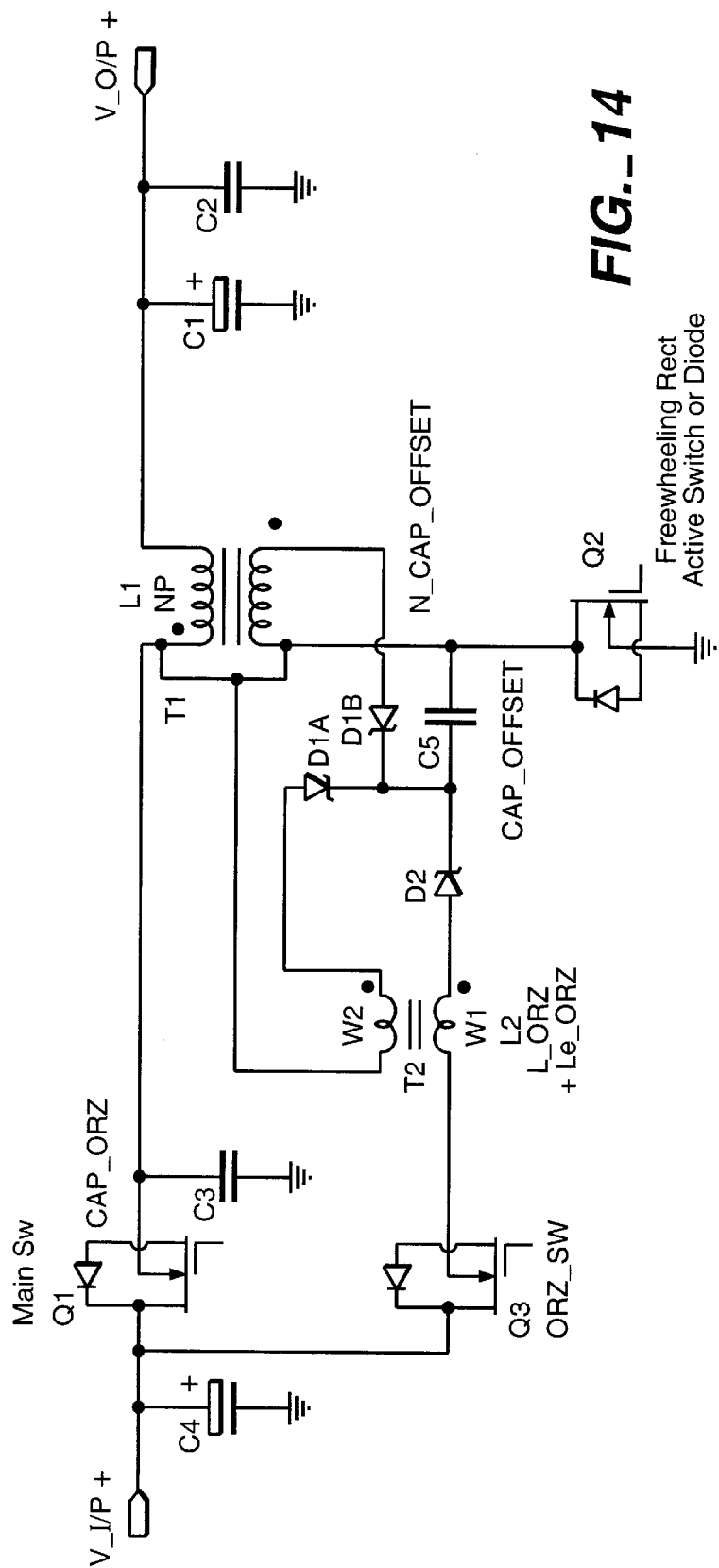
FIG._14

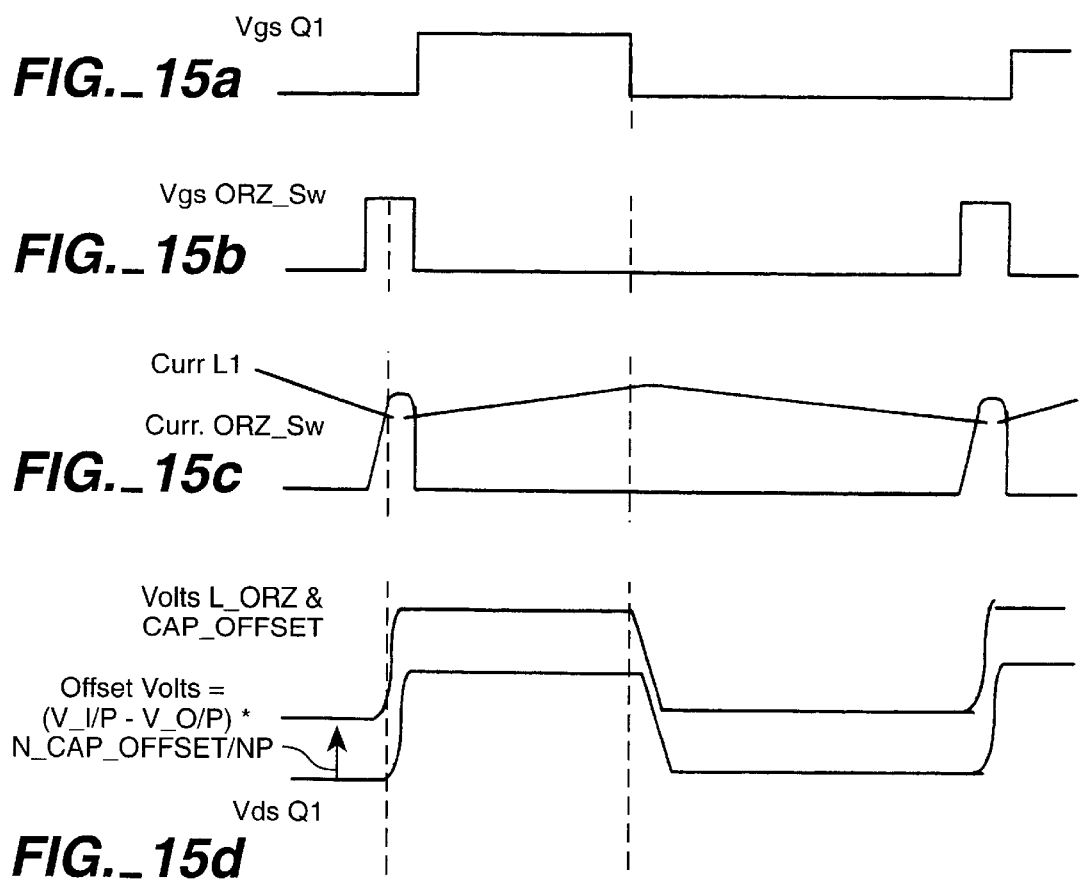

US 6,249,444 B1

OFFSET RESONANT ZVS FORWARD CONVERTER

BACKGROUND OF THE INVENTION

1. Field of the Invention

The present invention relates to switched power supplies, and more specifically, to a forward converter that incorporates a switched shunt inductance coupled in parallel across the primary winding of the power transformer. The shunt inductance is used to produce a zero volt switching condition across the power switch of the power supply, permitting the power switch to be resonantly switched on with zero volts across it. In one embodiment, the converter circuit also includes an offset capacitor in series with the switched inductance, and a magnetic voltage averaging circuit. These components act to average the voltage across the primary power switch and control the magnetizing current in the power transformer. These features reduce the power losses associated with changing the state of the power switch compared to conventional zero volt switching forward converter circuits, and improve the overall efficiency of the converter by acting to reset the magnetic core of the power transformer.

2. Description of the Prior Art

Switching or "switch mode" power supplies use a semiconductor device as a power switch to control the application of a voltage to a load. A forward converter is used to provide a regulated output (or load) voltage which is lower than the input voltage ($V_{IN}$) supplied by the input power supply. FIG. 1 is a schematic diagram showing a circuit for a conventional prior art forward converter 100. Applying a waveform to gate node 103 controls the operation of power switch Q1 102 (which is shown as a MOSFET device but may be of other types). The waveform applied to gate node 103 is typically provided by a control circuit (not shown) which supplies a pulsed control signal using pulse width modulation (PWM), for example. When switch 102 is turned "on", i.e., conducting, the input voltage $V_{IN}$ is applied across the primary winding of power transformer 104. A secondary voltage, $V_S$, is developed across the secondary winding of transformer 104 and applied across forward output rectifier $D_{O1}$ 106 (which then becomes forward biased). Current and power flows to output inductor $L_O$ 108 and output capacitor $C_O$ 110 (which form a LC filter), and load $R_L$. Assuming a sufficiently large enough value for output capacitor $C_O$ 110, and neglecting diode drops and losses, the voltage across inductor 108 will be equal to $V_S$ minus the output voltage, $V_{OUT}$. The current ($i_L$) in inductor 108 will increase linearly with time and will be described by:

$$di_L/dt = (V_S - V_{OUT})L_O.$$

Note that additional losses may be caused by an increase in the conduction losses in the primary circuit due to the higher RMS current necessary to sustain a resonance condition.

When power switch Q1 is turned off, i.e., non-conducting, the secondary voltage $V_S$ will reverse. However, the current in inductor 108 will continue to flow in the forward direction rendering "freewheeling" output diode $D_{O2}$ 112 conductive (forward biased). This permits the current to continue circulating in the circuit loop formed from diode 112, inductor 108, capacitor 110, and load $R_L$ (which is applied across the output terminals). The voltage across inductor 108 eventually reverses, having a value equal to the output voltage $V_{OUT}$ (again neglecting diode drops). The current in inductor 108 now decreases with time, and may be described by:

$$di_L/dt = (-V_{OUT})/L_O.$$

In a steady-state condition, the volt-seconds applied to inductor 108 are equal in the forward and reverse directions. Thus, when the "on" period for switch 102 ($t_{on}$) during a cycle is equal to the "off" period ($t_{off}$) during a cycle, the output voltage $V_{OUT}$ will be equal to one-half the value of the secondary side voltage $V_S$. When the ratio of the power switch's "on" time to "off" time differs from a 50% duty factor (with the duty factor defined by $t_{on}/(t_{on}+t_{off})$), the output voltage is given by:

$$V_{OUT} = V_S * t_{on}/(t_{on}+t_{off}).$$

A drawback of switch mode power circuits as described above is that the switching devices in such circuits are subjected to high stresses and potentially high switching power losses as a result of the switch being changed from one state to another while having a significant voltage across it. These effects increase linearly with the switching frequency of the waveform used to control the power switch. Another drawback of switched power circuits is the electromagnetic interference arising from the large change in current (di/dt) and voltage (dV/dt) that occurs when the switch changes state.

The noted disadvantages of switch mode power converters can be reduced if each power switch in the circuit is caused to change its state (from "on" to "off" or vice versa) when the voltage and/or current through it is zero or at a minimum value. When the switch is changed under a condition of zero voltage or current, the control scheme is termed "zero-voltage" and/or "zero current" switching. In the case of switching at a minimum voltage, the control scheme is termed "low-voltage" switching. It is thus desirable to switch the power switching device(s) at instances of zero or minimum voltage in order to reduce stress on the switch(es) and the sources of power loss of the power supply or converter.

One method of implementing zero voltage switching is to provide a voltage signal across the power switch which passes through a zero value and then to control the switch to change states at the appropriate time relative to that signal. This is conventionally done by introducing a resonant network (for example, a series combination of an inductor and a capacitor) into the power supply circuit. The resonant network is connected to the power switch and acts to smooth the output signal of the power supply and provide a back emf across the power switch in the form of a sinusoidally varying waveform. The resonant elements are arranged so that the back emf waveform generates a zero crossing voltage signal across the power switch while the switch is off. This provides a zero-voltage or zero-current condition through the power switch, which is used to define the desirable switching point(s) for turning the switch on.

During each switching cycle in the operation of such resonantly switched Zero Voltage Switching (ZVS) power converters, the voltage across the power switch is driven to zero by the action of the inductive load which is part of the resonant network, and ideally, the switch is then turned on. This typically requires that ZVS Resonant converters have a large LC tank to ensure that there is sufficient inductive energy to drive the voltage across the switch to zero. However, a disadvantage of this means of providing a zero voltage signal across the power switch is that there is a significant power loss associated with the large intrinsic resistance of the resonant network capacitance and inductance, with the power loss being approximately proportional to the values of those elements.

Another important aspect of conventional forward converter circuits is that the magnetic core of the power transformer must be reset after each cycle. This prevents saturation of the transformer core and reduces the losses of the circuit. Power transformer reset is conventionally achieved by use of a tertiary winding which is coupled to the core. However, a disadvantage of this approach is that it complicates the design of the power transformer and typically results in an increase in the size and cost of the transformer.

Another feature of many conventional forward converters is the use of an active clamp as part of the circuit. An active clamp is typically formed from a series combination of a switching element and a clamp capacitor, with the series combination connected in parallel across the primary winding of the power transformer. The active clamp is used to reduce the stress imposed on the power switch and the power dissipated by the switch. An active clamp also can be used to recycle some of the magnetizing current built up in the transformer core, reducing losses for the circuit. However, a disadvantage of using an active clamp is that the current through the clamp switch can be high enough to make the $I^2R$ losses in the equivalent series resistance of the clamp capacitor and switch a significant source of power loss.

In order to obtain ZVS conditions for the main switch and commutate the current in the secondary rectifiers to obtain efficiency at high operating frequencies and in particular high line conditions:

(1) the transformer magnetizing current in the clamp switch can be greater than 30% of the reflected peak secondary load current in magnitude. This increases conduction losses for the transformer, clamp capacitor, main and clamp switches and the turn off losses for the main and clamp switches;

(2) substantial transformer leakage inductance is required which results in higher voltage ratings for the secondary rectifiers because of the leakage inductance related secondary transient voltages which are produced;

(3) in lower voltage input circuits where adequate transformer leakage inductance cannot be provided, a secondary circuit AC choke is required (causing a loss of efficiency in particular for the low output voltage circuits); and (4) extra secondary driving controls and delays are needed to prevent high cross conduction losses when using synchronous rectification. This can often mean independent pulse transformers, extra windings on the main transformer and output choke to provide adequate gate drive voltages for the two synchronous rectifiers and separate secondary circuits to provide the delays.

In order to improve the stability of forward clamped circuits, small values of the clamp capacitor are utilized. This produces a large amount of ripple voltage that can increase the voltage ratings of both the main and the clamp switch (which have similar high voltage ratings).

What is desired is a forward converter circuit which is capable of zero voltage power switch operation, where the circuit elements responsible for the zero voltage switching result in lower power loss than those found in conventional devices. It is also desired to have a forward converter circuit in which the primary power transformer does not require a tertiary reset winding. It is further desired to have a forward converter circuit which does not utilize an active clamp to reduce the stress applied to the power switch.

SUMMARY OF THE INVENTION

The present invention is directed to a forward converter circuit that includes elements capable of generating a zero volt switching (ZVS) signal across the power switch. The ZVS generating elements include a series combination of a switch and shunt inductance, which are connected in parallel across the primary winding of the power transformer. An offset capacitor is placed in series with the shunt inductance and is operated in conjunction with a control circuit to couple the magnetizing current from the primary winding of the power transformer and use it to charge the offset capacitor. This provides zero volt switching of the power switch at turn-on and turn-off, and reset of the core of the power transformer without the use of a tertiary winding. The inventive circuit also achieves added protection of the power switch without the use of an active clamp.

BRIEF DESCRIPTION OF THE DRAWINGS

FIG. 1 is a schematic diagram showing a circuit for a conventional prior art forward converter.

FIG. 2 is a schematic diagram of a first embodiment of the zero volt switching forward converter of the present invention.

FIGS. 3($a$) to 3($g$) are a set of voltage and current waveforms that illustrate the operation of the inventive ZVS forward converter of FIG. 2.

FIG. 4 is a schematic diagram of a second embodiment of the zero volt switching forward converter of the present invention.

FIGS. 5($a$) to 5($h$) and 5($j$) are a set of voltage and current waveforms that illustrate the operation of the inventive ZVS forward converter of FIG. 4.

FIG. 6 is a schematic diagram of an embodiment of the zero volt switching forward converter of the present invention that identifies the currents flowing through the offset capacitor for both the ORZ_1 and ORZ_2 modes of operation.

FIGS. 7($a$) to 7($d$) are a set of voltage and current waveforms that illustrate the operation of the circuit of FIG. 6.

FIGS. 8($a$) to 8($e$) are a set of voltage and current waveforms that illustrate how adjustment of the ratio of the primary winding to offset capacitor turns can minimize the voltage rating for the power switch and the discontinuous verses continuous magnetic current.

FIGS. 9($a$) to 9($d$) are a set of voltage and current waveforms that illustrate how the timing of the ORZ_2 mode permits lower loss turn off of the power switch for the circuit of FIG. 6.

FIG. 10 is a schematic diagram of a zero voltage detection circuit which provides an isolated interface for switching off the ORZ switch to control the energy changeover point of an ORZ_1 to an ORZ_2 pulse condition.

FIG. 11 is a set of curves plotting the overswing voltage as a function of input voltage for differing maximum values of the duty ratio during operation of the inventive forward converter.

FIG. 12 is a schematic diagram showing an embodiment of the present invention in which the secondary side synchronous rectifiers have both active FETS and Schottky diodes in parallel and extra transformer windings to direct transformer magnetic energy to the associated capacitance's.

FIG. 13 is a schematic diagram of an embodiment of the present invention in which the secondary side includes a synchronous rectifying circuit in which the freewheeling rectifier is actively turned off from transformer windings connected to the ORZ transformer.

FIGS. 13($a$) to (13$h$) are a set of waveforms illustrating the modes of operation that are applicable to the circuit of FIG. 13.

FIG. 14 is a schematic diagram of a switching regulator circuit that includes the ORZ and offset capacitor elements of the present invention.

FIGS. 15(a) to 15(d) are a set of voltage and current waveforms that illustrate the operation of the circuit of FIG. 14.

DETAILED DESCRIPTION OF THE INVENTION

The present invention is directed to an offset resonance, zero volt switching (ORZ) circuit for a forward converter switched mode power supply. The ORZ circuit includes a switched shunt inductance that is referenced to the input supply level and is used to provide a zero volt switching waveform across the power switch. In one embodiment, the ORZ forward converter also includes an offset capacitor connected in series with the shunt inductance and a circuit for controlling the charging of the offset capacitor by transferring energy stored in the magnetizing inductance of the primary winding of the power transformer to the capacitor. The offset capacitor charging circuit acts to average the voltage across the power switch, reset the primary winding, and provide a sufficient voltage to build up the current in the shunt inductance and commutate the secondary current from the freewheeling diode to the forward diode. This is achieved without the use of an active clamp.

In order to provide ZVS conditions for the main switch and commutate the secondary current correctly there is no requirement for a secondary AC inductance or high transformer leakage inductance. The transformer magnetizing energy should be as low as possible, minimizing conduction losses in the main switch and transformer primary winding. Because substantial snubber capacitance can be used across the main switch and ZVS conditions can still be achieved, the turn off loss of the main switch can be reduced. The voltage rating for the main switch can be minimized as the offset capacitor clamps the voltage without the need for any stability considerations.

The voltage rating of the ORZ switch is substantially below the clamp switch, approximately 30% or less and the duration of the ORZ pulse is less than 10% of the total period, whereas the active clamp may have to conduct for up to 80% of the total period. The ORZ switch can have either a zero current turn on and turn off loss or low capacitance limited active turn off loss. The offset switch or diode has a zero current turn on and turn off loss with a maximum voltage rating equal to the supply level.

Information associated with the driving of secondary synchronous rectifiers can be provided from the offset resonance conditions, on turn on and turn off for the main switch, which correspond directly to both commutation states between the two synchronous rectifiers. Windings attached to the ORZ choke can be used to provide direct driving to the synchronous rectifiers under all circuit conditions without additional windings that can compromise the design of other magnetic components. The ORZ circuit provides optimized soft turn off for the secondary rectifiers, which is particularly advantageous for active synchronous rectifiers. These circuit features reduce losses as compared to an active clamp containing circuit.

FIG. 2 is a schematic diagram of a first embodiment of the zero volt switching forward converter of the present invention. As shown in the figure, along with the additional components to be described, the inventive converter includes the basic components of a conventional forward converter. A power switch Q1 (with body diode 206) is connected in series with the primary winding 228 of power transformer 240, with the series combination connected in parallel across the input supply voltage (labeled $V_{S+}$, node 20 and $V_{S-}$, node 10 in the figure). On the secondary side of transformer 240, forward rectifier 232 and freewheeling rectifier 234 have cathodes connected at a common node and anodes connected across the secondary winding. Output inductor 236 is connected between the common node and a first output node (labeled node 30 in the figure). A second output node (labeled node 40 in the figure) is connected to the anode of rectifier 234. Output capacitor 238 is connected in parallel across the first and second output nodes. Input capacitor 280 is connected in parallel across the input supply voltage (nodes 10 and 20).

In accordance with the present invention, ORZ switch 202 (having body diode 200) is connected in a series combination with ORZ inductor 214 and offset capacitor 212. This series combination is connected in parallel across primary winding 228. ORZ capacitor 208 (labeled "C_ORZ") is coupled in parallel across power switch Q1. Capacitor 208 typically comprises the parasitic capacitance of power switch Q1. Additionally, capacitor 208 may comprise a discreet component (e.g. a resonant snubber capacitor) coupled in parallel with the parasitic capacitance. The leakage inductance of ORZ inductor 214 is shown as inductive element 216 and the leakage inductance of the primary winding is shown as inductive element 226.

When ORZ switch 202 is closed, a current will build up in ORZ inductor 214, with the magnitude of the current being independent of the component values of the ORZ circuit elements. As further recognized by the present inventor, the voltage swing through the ORZ inductor-ORZ capacitor combination, with the common node at a high level and current flowing, is symmetrical over time and independent of the LC component values. Thus, the effect of the ORZ current is to increase the excursion of the voltage across the power switch below the supply rail. If the voltage excursion below the supply exceeds that of the input supply level, then a zero voltage condition across the power switch will occur. The magnitude of the voltage excursion depends upon the converter topology and circuit conditions, and is equal to at least the overswing voltage present when ORZ switch 202 is turned on, with V_Overswing being the difference between the drain voltage of Q1 and the supply voltage ($V_S$).

The value of the snubber capacitor which forms part of C_ORZ 208 may be adjusted to achieve the desired operating characteristics of the ORZ circuitry, e.g., by modifying the transient voltage generated by primary winding 228 when power switch Q1 (or ORZ switch 202) is turned off. A large value of the snubber capacitance assists in producing a significant reduction in the turn off losses of the power switch, thereby improving the efficiency of the inventive converter. This permits the use of high frequency FET devices for the power switch in conjunction with lower power losses. It also permits slower switching devices such as insulated gate bipolar transistors (IGBTs) to be used for the power switch.

Also part of the inventive circuit is an extra winding 242 added to the primary side of power transformer 240. Winding 242 supplies a positive voltage and the magnetizing current used to charge offset capacitor 212 positively with respect to ORZ inductor 214. Winding 242 acts to transfer the magnetizing current from primary winding 228 and averages the reflected voltage seen on the primary winding and superimposed upon offset capacitor 212, via diode 220, winding 242 and the leakage inductance of the extra winding reflected at turn off (shown as inductive element 224). As shown in the figure, winding 242, leakage inductance 224, and diode 220 are connected to form a series combination that is connected in parallel across offset capacitor 212.

The switching behavior of power switch Q1 is controlled by Main Switch Control 270, while that of ORZ switch 202 is controlled by ORZ Switch Control 260. As shown in the figure, both switches may be operated by application of an appropriate control signal to the respective gate nodes of the switches. In the case of the ORZ switch, the control signal may be isolated from the gate node by use of transformer 250.

The negative magnetizing current in power transformer 240 produces the negative charge in the capacitor, 212, which is shown as "I_MAG in 220" in the waveform of FIG. 3(f). This will be balanced out by the positive current and charge put into the offset capacitor by the ORZ switch activity, as shown in the diagram labeled "L_ORZ Current" in FIG. 3(e). The effect of winding 242 and offset capacitor 212 is to couple energy from the magnetic core of power transformer 240 and use it to average the voltage seen across power switch Q1. This serves to optimize the maximum voltage that Q1 has to support under any load or line conditions. This allows a lower resistive FET and results in a more efficient converter, as compared to a normal single ended converter with resonant snubber techniques applied (where the voltage rating has to be some 30% higher).

As noted, a benefit of the offset capacitor is to average the voltage seen on the power switch, not only to limit the peak voltage across power switch, Q1, but also to control the minimum voltage across it. This behavior is related to the overswing voltage (indicated as V_overswing in FIG. 3(c)) that is used by the ORZ switch. The overswing voltage occurs prior to the commencement of the ORZ switch drive pulse at time $t_1$ in FIG. 3(b), as compared to converters without a large value for ORZ capacitor 208, and this allows I_MAG to have dropped to zero just prior to $t_1$.

By adding the offset capacitor voltage to the normal overswing voltage, the resulting ORZ switch voltage that is across the ORZ inductor is dependent upon the level of the input supply voltage. When the supply voltage is low no extra voltage is added, whereas when the input voltage is high a proportion of the supply voltage is added. Thus, for high line operation, there is an offset voltage added to the overswing voltage. This results in the natural resonant ring voltage (or underswing voltage) being equal to the supply voltage. This provides a means of achieving fill or near full ZVS for the main switch under different input line conditions without turning off the ORZ switch Another function of the offset capacitor and its charging circuitry is to provide a voltage so that the current can be built up in ORZ inductor 214 to a level sufficient to commutate the secondary current from freewheeling diode 234 to forward diode 232. The current ($I_2$) in L_ORZ 214 at time $t_2$ may be described by:

$$I_2 = (V\_OVERSWING/2 + V\_OFFSET) * t_2)/L\_ORZ.$$

As can be seen from this relationship, even with V_OVERSWING equal to zero, which occurs at $t_2$, the current in L_ORZ will increase until it reaches the level of the current in the secondary at time $t_3$. This is shown in the graph for the current in forward diode 232 in FIG. 3(g) (labeled "I_FWD_Diode, 232").

This mode of operation solves a significant problem encountered when attempting to apply the inventive ORZ technique to forward converters. When the overswing voltage reaches zero (and thus the voltage across the transformer secondary reaches zero), there is no further way of significantly increasing the current in the ORZ inductor. This means that there is no way of increasing the current in the secondary at this point. However, the voltage will not change significantly across offset capacitor 212 for increases in the ORZ inductor current from times $t_2$, to $t_3$. Thus, the primary and secondary leakage inductances (Le_P 226 and Le_S 230, respectively) can have relatively small values without the use of an extra AC choke in the secondary circuits.

After the time period $t_3$, when the current has been commutated from rectifier 234 into rectifier 232, the voltage which has been held up by the secondary rectifier current commutation process will begin to decrease. In this regard, note that as shown in FIG. 3(c), the voltage on power switch Q1's drain has been static from $t_2$ to $t_3$. Between times $t_3$ and $t_4$ this voltage will fall, with the current increasing slowly, until at time $t_4$ the voltage across the ORZ inductor is zero. However, the voltage has fallen on ORZ capacitor 208 by the same amount, as the offset voltage (V_OFFSET) is above the input supply level. As the inventor has realized, this suggests that the value of V_OFFSET can be varied independently of the input supply voltage and load to provide for a voltage offset swing sufficient to provide full or nearly full ZVS for the power switch. Any extra ZVS signal needed may be provided by the turn off for the ORZ switch, as shown at time $t_5$.

For situations where additional windings (e.g., element 242) on the power transformer would be difficult or undesirable to provide, alternative techniques can be used to provide similar advantages. In this regard, the following additional ways may be used to control the charge level of the offset capacitor:

(1) a secondary optional winding, labeled "Les_orz, 276" in FIG. 4 on the ORZ inductor 214 may be provided and connected via a diode 274 to offset capacitor 212. The current (labeled "L_ORZ_Sec Current" in FIG. 5(f)) from this winding (identified as element 121) flows in opposition to the charging current from the ORZ inductor (labeled "L_ORZ Current, and identified as element 120" in FIG. 5(e)). Note that this method is not optimal, as it can not replace the charge associated with the ORZ current, since 120>121;

(2) an offset switch (labeled "OFFSET Sw", 217, in FIG. 4) may be positioned in series between primary winding 228 and offset capacitor 212. The offset switch is turned on across diode 210 (which may be the body diode of the switch) prior to the voltage on the drain of switch Q1 increasing after Q1 is turned off The body diode 200 of ORZ switch 202 will conduct and this will cause a reverse charge current to flow (shown as element 124 in FIG. 5(e)) in the ORZ inductor and through the offset capacitor. The ORZ switch will be turned on for a period of time after the body diode of the offset switch conducts and the offset switch can then be turned off Thus, the current in the ORZ inductor will reduce to zero and any excess current will be put into the offset capacitor via the ORZ inductor.

The voltage on the drain of switch Q1 can be affected by the turn off process, with the initial leakage related turn off being limited. This is shown in FIG. 5(b), for the case of waveform 102 with normal turn off and virtually no voltage across the ORZ inductor. This situation can be compared to that shown as waveform 105, for the case of the resultant turn off using the offset switch. Waveform 103 is the resultant sum of the overswing voltage and offset voltage, and waveform 101 is the voltage seen by the voltage averaging circuit of FIG. 2.

The advantages of the inventive forward converter circuit, which includes the ORZ circuit components and an offset capacitor in series with the ORZ inductor, may be described as follows:

(1) the peak voltage on the power switch may be controlled and the average voltage can be controlled across the turn off period;

(2) the magnetizing current can be controlled and used to provide an efficient means for reseting the primary winding of the power transformer; and (3) the circuit provides for commutation of the current from the freewheeling rectifier (which may be an active synchronous rectifier) to the forward diode without additional components. This feature is not possible with conventional active clamp forward converter circuits.

Normally the ORZ_2 state would be used after a fixed overall period of the first resonance condition, if fill ZVS operation has not been achieved to terminate the ORZ_1 pulse. This produces an ORZ_2 resonance, using in part the leakage inductance of the ORZ inductor, rather than just its inductance. As noted, this second type of resonance would be used after a fixed overall period of the first type of resonance, if full ZVS has not been achieved to terminate the pulse.

The inventive control method is one which calculates the amount of energy left in the inductor and the residual voltage on the ORZ capacitor to determine when the first resonance condition pulse should be terminated. Operation in the second type of resonance condition is precluded in prior art circuits concerned with high secondary current loads where no resonance capacitance is used, and only stray or inherent component capacitance's which might be modified by electromagnetic interference are of concern.

The optimization algorithm is as follows:

```
DO WHILE ((L_ORZ * 0.5 * (I_ORZ) **2..LT. 0.5*CORZ * (V_Drain Q1) **2..AND.
                    V_DRAIN Q1 .GE. (0.9 * V_Supply) )
        OR.
              T ORZ.LT. Max Duration )
```

Although the mode of operation described with reference to FIGS. 3 and 5 (which will be referred to as the ORZ_1 mode of operation) achieves many of the benefits of zero volt switching operation, it is possible to achieve more complete zero volt switching and its related benefits by utilizing the energy stored in the $L_{ORZ}$ inductor (or transformer if one is used) to further reduce the voltage across the power switch. This will be referred to as the ORZ_2 mode of operation.

The reason for this behavior is as follows. The energy that the resonant ORZ circuit provides is the integration over the period of the average voltage difference across the ORZ inductor. This provides enough resonance energy to push the voltage on the ORZ inductor below the supply by at least much as the energy gained. The ORZ resonance operating with a continuous current will ensure a larger integrated energy. This will push the inductor to a lower voltage, while the transformer primary winding continuous current will hold the inductor from dropping further. In effect, in this case the ORZ inductor current is attempting to become equal to the transformer primary winding current, which is continuous and cannot supply further energy to the ORZ capacitor.

Application of the second ORZ resonance situation (i.e., ORZ_2) causes the voltage across the ORZ switch to reduce at a higher rate. This is because the current still flowing in the ORZ switch will immediately cause the current to flow out from the ORZ inductor into the ORZ capacitor instead of having to supply the continuous load current. In effect, it is disconnected from the primary winding current by the leakage inductance of the ORZ inductor. The voltage at one end of the ORZ inductor rises above the voltage across the ORZ switch, while the voltage at the other end of the ORZ inductor falls. There is no residual energy left in the ORZ inductor and all the energy will have been used to commutate the large value of ORZ capacitance.

This suggests that a control algorithm can be applied to use the energy in the ORZ inductor earlier in the second resonance condition in order to maximize the ZVS state.

This causes the circuit to cycle around in the first ORZ resonance condition while energy in the ORZ inductor is less than the energy necessary to discharge the ORZ capacitance and the voltage on Q1 is clamped to the transformer output voltage (which is equal to the forward voltage across the freewheeling rectifier diode 234 in FIG. 2 and FIG. 4), until the current in 234 has been commutated to the forward diode, 232 in FIG. 2 and FIG. 4. This current (that was commutated from diode 234 to diode 232) is equal to the load current flowing in choke L, 236 in FIG. 2 and FIG. 4. After the commutation of current has occurred, the voltage on the drain of Q1 will drop below the supply level and a ORZ_2 condition or turn off for the ORZ switch can occur. The other alternative for continuing the DO LOOP is that the ORZ process may carry on if the time of the ORZ pulse, "T ORZ" is less than a Max Duration time, possibly around 300 nS.

```
! Allow ORZ_1 to continue
END DO
create an ORZ_2 turn off
```

Measuring both the voltages on the switch, which would be already monitored for a ZVS condition, and suitable placement of the normal current transformer should allow the current measurement to provide the desired control signal.

As is evident, the offset capacitor element of the present invention (and its associated voltage averaging elements) enable the inventive circuit to control the voltage across the power switch and reset the primary winding of the power transformer. Thus, the control of the voltage across the offset capacitor is an important aspect of the invention. This aspect will now be discussed in greater detail.

FIG. 6 is a schematic diagram of an embodiment of the zero volt switching forward converter of the present invention that identifies the currents flowing through the offset capacitor for both the ORZ_1 and ORZ_2 modes of operation. In FIG. 6, the ORZ inductor, L_ORZ, is shown as the primary winding W1 of the flyback transformer T3. This circuit arrangement allows energy to be transferred to the CAP_OFFSET via D102 and the secondary winding W2 of T3, with any residual energy in Transformer T3 after the ORZ_Sw Q3 has been turned off. FIGS. 7(a) to 7(d) are a set of voltage and current waveforms that illustrate the operation of the circuit of FIG. 6. It is noted that controlling the transition between the ORZ_1 and ORZ_2 modes causes a variation in the voltage across the offset capacitor and permits correcting for E*T magnetizing currents (where "E" is the applied voltage to the primary transformer winding and "T" is the period of time for which the voltage "E" is applied). The positive magnetizing current generated during the period when Q1 is on has to be reset when Q1 is off.

The magnetizing currents in T1, the power transformer core, will be balanced when the voltage across the offset capacitor is sufficient to allow all the magnetizing current held in the primary of the Transformer T1, to decay to zero during the period when power switch Q1 has been turned off. During this off period the primary winding W2 of the transformer T1 is clamped by diode D100, at the value of voltage on the offset capacitor. The magnetizing current is generated in the primary of T1 transformer winding W1 during the period when Q1 is on and can be transferred to winding W2 when Q1 is off.

The value of the offset capacitor is sufficiently large and will not be affected during each cycle by the magnetizing current, and other ORZ related currents are also flowing through the offset capacitor during each cycle. Thus, it is desirable to have a method of controlling the voltage on the offset capacitor (and by definition the flow of energy into the offset capacitor) so that it is kept at a voltage that is just adequate to allow all the magnetizing energy to be removed from the transformer T1 during the off period of the power switch.

Note that if the voltage on the offset capacitor is larger than is necessary to remove the magnetizing energy, two significant benefits would be lost:

(1) the ratings of both the main switching devices and secondary rectifying components would have to increased over and above the rating of the switch voltage necessary to satisfy the "E*T" criteria; and (2) the secondary transformer voltages that could control any synchronous active rectification would vary significantly in value during the period when Q1 was off.

Both of the above issues are problems associated with a normal single ended forward regulator using either passive resistive, capacitive and diode or passive resonant snubber techniques. However, use of an active clamp with a Forward converter does not necessarily provide full solutions to the above problems. This is because in order to ensure better stability under transient and low load discontinuous conditions a minimum value of the clamp capacitor is used. This allows a large amount of voltage ripple (e.g., up to thirty percent) on the clamp capacitor. This is opposed to the goal of having a maximum design voltage on the main switch and the related efficiency gains of a lower Rds (source-drain resistance) on the switch.

The timing of the switch off for Q3, the ORZ switch shown in FIG. 6 (labeled "ORZ_SW" in the figure), can be varied between its initial ORZ_1 state where charge and energy is taken from the offset capacitor reducing its voltage, and the ORZ_2 state where the ORZ transformer leakage energy is used to finish off the ZVS for the main power switch (i.e., Q1). Any residual energy still in ORZ transformer T3 is put back into the offset capacitor via winding W2 of T3 and diode D102. FIGS. 7(a) and 7(b) illustrate that an earlier or later transition to an ORZ_2 mode can change the voltage or reduce the level of charge in the offset capacitor, with an earlier ORZ_2 mode increasing the level of charge in the offset capacitor and a later ORZ_2 mode decreasing the voltage or charge in the offset capacitor. The amount of charge taken from the offset capacitor for an ORZ_1 mode is the amount of energy under the ORZ current pulse curve. The amount of energy to the right of the fine lines shown in FIGS. 7(a) and 7(b) is dependent on the termination time of the ORZ pulse and is approximately equal to the energy that can be put back into the offset capacitor. This provides a significant benefit by providing a magnetizing E*T correction and adjustment of the ORZ_1 to ORZ_2 timing using a simple control system associated with the offset capacitor voltage, while accomplishing the original aim of achieving ZVS for the main switch.

The timing variation can be described as follows in conjunction with the waveforms shown in FIG. 7. Prior to the ORZ logic drive (FIG. (7(c)) changing state, the overswing voltage (V_Overswing, FIG. 7(a)) is seen across primary winding W1 of power transformer T1, between the positive supply level and the junction of the drain of Q1 and the offset capacitor. The higher voltage is across winding W2 of power transformer T1, and is controlled by the offset capacitor, shown as the curve labeled V_Offset_Cap in FIG. 7(a). This voltage is proportional to the E*T magnetizing product.

After Q3, the ORZ switch, is turned on, the voltages associated with both windings W1 and W2 of the power transformer T1 will begin to fall until the voltage across the secondary winding W4 is at zero volts. After this, freewheeling diode D2 will block any further change in primary voltage until the current in the secondary of T1 reflected back to the primary and limited by the ORZ inductance value have equalized. This is shown in FIG. 7(a) by the abrupt stoppage of the falling of the voltages for a period of time until I_ORZ=I O/P*NS/NP. This will provide optimum secondary conditions for slow commutation of the freewheeling diode with limited DI/DT, and the transfer of the current from the freewheeling diode D2 into the forward diode D1. This DI/DT will be defined by:

(V_OFFSET_CAP/L-ORZ)*NP/NS

After the current has been commutated from the freewheeling diode, current will increase in the ORZ inductance until there is no voltage across the ORZ inductance. This is a benefit in order to achieve ZVS with the ORZ_1 condition, as the current in the ORZ inductance is greater than the reflected load current and is gaining energy to ensure that the ZVS condition with ORZ_1 will be at least at the voltage level below the supply of (V_Overswing+ V_Offset_Cap). This can be important for two reasons:

(1) the secondary load current will start to increase once the voltage on D2 has changed state to be at a higher voltage on the cathode of D1 than the output VO+ (although the condition initially will aid the ZVS process as the current in the ORZ inductor will drop lower than the primary ORZ current, providing more current to discharge the ORZ capacitor); and (2) for higher frequency operation, particularly for lower input voltage designs 24V or −48V, the number of turns needed on the transformer is extremely low and thus any leakage inductance which may help the commutation process between the output rectifiers is also extremely low.

If an ORZ_2 mode is not caused to occur and ORZ switch Q3 is not turned off with current in the ORZ inductance, all the resonant energy of the inductance is returned to the supply- However, during the ORZ_1 mode all the charge is removed from the offset capacitor and none is replaced during the 0RZ_2 mode. This means that the balance of the ORZ currents and the voltage across W2 will have to be provided by the magnetizing energy during the period when power switch Q1 is off and the leakage energy held in transformer TI at the turn off for Q1. This means that there are different operational cases which should be considered in order to meet the overall objectives of the ORZ process.

There are several energy balance states for the offset capacitor to enable the transformer magnetizing current to be reset and the minimum overswing voltage to be established. The differing cases are associated with the amount of energy that the offset capacitor has to balance:

(1) maximum magnetic energy associated-with the minimum leakage energy and minimum ORZ_1 and ORZ_2 energy as the load is at a minimum. The maximum magnetic and minimum leakage energy condition will occur at minimum load, prior to discontinuous inductor O/P condition. The minimum current will occur when the minimum main switch current in power switch Q1 is zero referred from the output inductor, L. The ORZ current will increase but will not be held up by commutation of the secondary current and will have enough energy to provide zero voltage conditions for the power switch. This mode of operation can use a minimum ORZ_2 mode to provide a corrected voltage across the offset capacitor. The peak leakage current will be two times the minimum controlled load current referred back to the primary. The criteria for this case is as follows:

mag_energy_max+leakage_energy_min+ORZ_2_energy_min= ORZ_1_energy_min+ORZ_1_discharge_energy, where ORZ_1_discharge-energy is the energy discharged from the offset capacitor between t3, the time where commutation of current in secondary diodes has occurred and t5, where an ORZ_2 condition occurs (see FIGS. 3 and 8);

(2) the short circuit load condition. This condition has a minimum magnetizing current but the leakage energy is at a maximum and the ORZ energy is also at a maximum. Thus, the ORZ energy should be set to balance the high leakage energy in a maximum over current condition, as the magnetic energy is very low. The criteria for this case is as follows:

leakage_energy_max=(ORZ_1_energy_max+ORZ_1_dischage_energy-ORZ_2_energy_min);

and (3) the maximum normal load condition. At maximum load, the ORZ operation should be set to provide a balance between the magnetizing energy, leakage energy, and ORZ_1 and ORZ_2 energies. The criteria for this case is as follows:

leakage_energy_max+mag_energy_max=(ORZ_1_energy_max+ORZ_1_discharge_energy)-ORZ_2_energy_min.

FIGS. 8(a) to 8(e) are a set of voltage and current waveforms that illustrate how adjustment of the ratio of the primary winding to offset capacitor turns can minimize the voltage rating for the power switch and the discontinuous verses continuous magnetic current. The voltage associated with V_Overswing can be reduced by changing the ratio of power transformer primary winding turns, NP of WI, to that of the auxiliary offset capacitor winding, N_OFFSET_CAP, of W2 of transformer T1. This can be done because the magnetizing current can be transferred to other windings at any level of voltage once the primary pulse has been terminated.

This situation permits the discharge of the magnetizing current at the same rate as for a Flyback Transformer, and also provides a method of control for the magnetizing current in either a discontinuous manner (magnetizing current is zero) or a continuous manner (with a non-zero magnetizing current) at, or before, the end of the off period for power switch Q1 prior to the start of the ORZ pulse. An advantage of keeping the magnetizing current slightly positive is that the voltage on the secondary has a known O/P voltage level for the entire off period and the voltage on the power switch must be at a minimum average voltage. There is another advantage of having a higher voltage across the offset capacitor, because even if the magnetizing current is at zero, the larger voltage across the offset capacitor will ensure a larger underswing voltage for an ORZ_1 mode pulse. FIGS. 9(a) to 9(d) are a set of voltage and current waveforms that illustrate how the timing of the ORZ_2 mode permits lower loss turn off of the power switch for the circuit of FIG. 6 with a high offset capacitor voltage as compared to FIG. 7, and is applicable to high line operation.

FIG. 10 is a schematic diagram of a zero voltage detection circuit which provides an isolated interface for switching off the ORZ switch to control the energy changeover point of an ORZ_1 to an ORZ_2 pulse condition. This causes the voltage on the offset capacitor to be controlled and correctly resets the transformer magnetizing current.

As shown in the figure, W3, a winding off the main transformer (which is normally used to provide an auxiliary logic supply) provides a good approximation to the voltage across the transformer and can be used to determine the correct "E*T" voltage needed on the offset capacitor. This "E*T" value is stored on capacitor C266 via resistor R266, and is used to generate a current in resistor R260 that will charge up capacitor C107 at a specific rate after the start of the ORZ pulse. Capacitor C107 is reset to a near zero voltage condition prior to the start of the ORZ pulse.

When the voltage on capacitor C266 is negative, the "E*T" product is too low and the voltage needs to be increased on the offset capacitor in order to prevent the magnetizing current in the core from staircasing (i.e., increasing the magnetizing current level on a cycle by cycle basis because the magnetizing current has not been reset completely). This is accomplished by terminating the ORZ pulse at an earlier time. The negative voltage increasing on capacitor C266 will increase the current through resistor R260 and charge capacitor C107 at a faster rate. In conjunction with the zero voltage pre-detection circuit, this will switch Q104 on earlier, changing the ORZ_1 state into a ORZ_2 state and increasing the overall charge and the voltage on in the offset capacitor. This feedback "E*T" current signal (labeled "CURR_ET_CONTROL" in the figure) will control the level of voltage on the offset capacitor to allow the power transformer's magnetic core to be reset.

The zero volt pre-detection circuit will detect the point when the voltage across main transformer primary winding W1 is below zero volts and therefore the current has been commutated from the freewheeling diode to the forward diode and an ORZ_1 to ORZ_2 state change can occur. Once this condition has been achieved, switch Q200 via resistor R210A and zener diode ZI is switched on and provides a current into resistor R218 which is summed with the signal CURR_ET_CONTROL into capacitor C107. This causes the rate at which C107 is charged to increase so that the voltage needed to switch on Q104 occurs at an earlier time for a higher CURR_ET_CONTROL current.

In order to more directly control the overswing voltage on the drain of the power switch Q1 so that the voltage does not become excessive and is kept near to continuous operation, this circuit will not allow the ORZ_2 condition to result in satisfaction of the "E*T" requirements and a larger than needed discontinuous magnetizing current period. FIG. 11 is a set of curves plotting the overswing voltage (labeled "V_Overswing") as a function of input voltage for differing maximum values of the duty ratio during operation of the inventive forward converter. This figure indicates that for certain of the designs chosen, the V_Overswing is very nearly constant (e.g., 15V for 20:5 transformer design and a ratio of 2:1 for the ratio of N_OFFSET_CAP:NP, over most of the usable design voltage, normally 35V to 72V). In addition, a peak design voltage below 100V can be considered rather than the 150 to 200V normally required for some applications with resonant or conventional resistor-capacitor snubbers.

The utilization of secondary side synchronous rectifiers which have both active FETs and Schottky diodes in parallel achieves several benefits that can be obtained by driving directly off the secondary transformer windings and is suitable for the ORZ primary driving techniques, as shown in FIG. 12:

(i) the use of the Schottky diodes allows satisfactory conduction in cases where the primary waveform is not adequate in voltage to drive the freewheeling FET, 260;
  (ii) diode 268 provides a low impedance turn off for 260 when commutating the current out of 260 into the forward rectifier 250. As the ORZ process has reduced the current in 260 with a low voltage across the transformer inadequate to drive the FET in 260, the current will have slowly commutated to the schottky diode in 260 with no recovery loss. It is beneficial to mount the schottky diode in very close proximity to the FET to reduce the circuit inductance and allow the current to commutate to the schottky diode, rather than the slower and lossy intrinsic body diode of the FET;
  (iii) the slow DV/DT at switch off for the main FET as a result of the ORZ capacitance on the primary allows the commutation of the current from the forward synchronous rectifier (SR), 250, to SR, 260, with a reduced commutation loss. The driving waveform from the transformer will reduce the driving gate source voltage to the FET in 250 as the transformer primary voltage reverses and thus the forward current will commutate to its schottky rectifier in 250 and allow 260 to cleanly take over the current that is continuously flowing in the output inductor 236.

In order to maintain the best driving voltages for 260, and to limit the peak voltage excursion for the primary main power switch, windings on the main transformer can be used to divert magnetic energy. The windings can be connected to either the output capacitance, 238, via winding 266, NS_Mag in FIG. 12, or to necessary local auxiliary supply requirements via winding 218, NP_Aux in FIG. 12, and then to capacitance 216 via diode 215. Because the ORZ process does not require large magnetic currents to flow, the use of these techniques is not precluded. In fact, the lower the magnetic currents, the easier is the problem of energy balance in the offset capacitance. This ORZ process is also aided by higher frequency operation, allowing adequate transformer inductance to control the level of magnetizing current, which is a fixed proportion of the load current. The primary transformer peak excursion voltage is controlled by diverting some of the magnetic energy to the external capacitance's which increases the period before all the magnetic energy has been removed from the transformer and the SR driving waveforms then deteriorate.

One of the benefits of supplying some magnetic energy to the output is that some energy can be supplied to the output when the current in 236 is reducing, at the latter portion of the freewheeling cycle, to reduce the ripple current and voltage in the output capacitor 238. The waveform 105 in FIG. 5 shows that energy would be provided to the secondary at the higher voltages of the primary waveform 105, which occurs during the latter part of the freewheeling cycle. This technique should be used in conjunction with controls to limit the level of the magnetic energy build up during short circuit output conditions, which could cause saturation of the transformer core.

Note that use of these techniques does not remove the necessity for the use of the offset capacitance and the circuit techniques necessary for the control of its voltage in order to obtain the ORZ benefits.

FIG. 13 shows a circuit which can be used to assist with the driving of a secondary SR using the offset resonance conditions, turn on and turn off of the main switch (which corresponds to both commutation states between the two SR's). Windings attached to the ORZ choke can be used to provide direct driving to the SR's under all circuit conditions without additional transformer windings that can compromise the design of other magnetic components, such as the output choke or main transformer. FIG. 13 is essentially the same primary circuit as was described previously for FIG. 4, but has SR's, forward 290 and freewheeling 281, without any additional added schottky diodes in parallel with the MOSFET devices.

The primary ORZ choke L_ORZ, 214, has isolated windings, 270 and 272, which are referenced to the output negative terminal, $V_{O-}$, and provide the correct voltages to turn on SR 281, via diode 294, and ensure the adequate and substantial turn off for SR281. This is accomplished by turning on a small active N channel Fet, 282, which is connected across the gate source terminals of SR 281. The signals to provide this control are shown relative to the timing diagrams in FIGS. 13(a) to (h), which illustrate the modes of operation that are applicable to the circuit of FIG. 13.

Consideration of the waveforms associated with Q1's drain 125 in FIG. 13(b) show that the voltage on Q1's drain drops to the supply level, removing any transformer related control signal for SR 281 with a significant proportion of the freewheeling period remaining. This is shown in FIG. 13(f), I_mag, which at time $t_{10}$ has fallen to zero, shown as signal 131 in FIG. 13(f). This illustrates the problem of using the main output winding or a higher voltage coupled winding derived from the transformer to drive the freewheeling SR in the case shown in FIG. 13(b), which would correspond to high overload condition where the duty ratio is low and magnetic energy is also low.

Looking at the waveform shown in FIG. 13(h), the volts across L_ORZ, it can be seen that the periods when the freewheeling SR 281 should conduct are between signals 140, when the offset switch has turned off (shown between time $t_8$ and $t_9$), and the period after the next occurrence of $t_5$. This coincides with the ORZ condition that has commutated the current completely from the freewheeling SR 281, which occurs as the phase of the voltage across the L_ORZ inductor changes, and is identified as signals 135 and 138. Thus the signal 140 can turn on SR 281, via diode 294, and this voltage is peak detected and held on the intrinsic gate source capacitance of SR 281 until turn off FET 282 discharges SR 281's gate source capacitance via the signal 138.

FIG. 14 is a schematic diagram of a switching regulator circuit that includes the ORZ and offset capacitor elements of the present invention. FIGS. 15(*a*) to 15(*d*) are a set of voltage and current waveforms illustrating the operation of the circuit of FIG. 14. In accordance with the present invention, the use of an active ORZ shunt switch Q3 in series with an offset capacitor C5 and an ORZ inductance provides certain unique benefits.

The offset capacitor voltage is caused to be at a voltage that is approximately half of the voltage between V_O/P and V_I/P, and is provided via a winding on inductance L1 of power transformer T1. This produces a voltage on capacitor C5 that is given by:

$$V\_CAP\_OFFSET=V\_I/P-V\_O/P)*N\_CAP\_OFFSET/NP$$

The FIG. 15 waveforms show that the turn on of the ORZ switch (Q3) allows the current to build up in the freewheeling rectifier and inductor L1. The optimum period for this buildup of the ORZ inductor will be in the region between 150 and 200 ns, and because of the positive offset capacitor voltage, the inductance value needed will be approximately halved in value:

$$L\_ORZ=(V\,I/P-V\_CAP\_OFFSET)*T\,REC/CURR\_L1$$

After the current in the ORZ inductor has achieved the same level of current as in L1, the voltage on the drain of power switch Q1 will increase and, while the voltage across the ORZ inductor is positive, will allow the current to increase in the inductor. As the voltage on the drain of Q1 increases so that the voltage across L2 becomes negative, the current in the ORZ inductor will start to decrease and allow Q1 to turn on with a zero voltage condition.

At this point, the following options are available:

(1) The current in the ORZ inductor can be left to decay to zero, providing a zero current turn off for switch Q3 and returning energy to the supply. This will occur in approximately 150 ns, as there is the same voltage reversed across the core L2 at the end of the pulse as at the beginning due to the positive offset voltage across the offset capacitor; or (2) Switch Q3 can be turned off and any excess ORZ inductor energy can be put into capacitor CS via winding W2 and diode D1A. The optimum condition for the turn off for Q3 will be before the voltage on the drain of switch Q1 has been charged up to the input supply. This is because at that point winding W1 will use the leakage inductance of the ORZ inductor (Le_ORZ) to achieve zero volt switching for switch Q1, and because the capacitance of the ORZ switch is voltage dependent upon and is similar to that of the ORZ capacitor, both of which have to be supplied by the ORZ inductor. This limits the turn off voltage rate for switch Q3 and any related losses.

A forward converter which includes a switched shunt inductance to produce a zero volt switching condition across the power switch has been disclosed. An embodiment of the inventive circuit further includes an offset capacitor arranged in series with the switched inductance and a circuit for coupling the magnetic current from the power transformer to charge the capacitor. The combination of circuit elements permits zero volt switching of the power switch and reset of the magnetic core of the power transformer without the use of an active clamp.

Note that Cap_Offset 212, both in FIG. 13 and FIG. 4, along with its optional charge winding 276 and diode 274, could be also positioned between the supply VS+ 20 and the anode of the ORZ switch intrinsic body diode 200 without changing the operation of the circuit. In these circuit configurations the inductor L_ORZ 214 and Lep-orz 216 would be connected between the cathode of the intrinsic body diode of the Offset Switch 210 and the anode of the ORZ switch intrinsic body diode 200. Note also that the Offset Switch and the ORZ switch could be P or N channel types as long as the relevant intrinsic body diodes 200 and 210 were positioned as shown in FIG. 4 or FIG. 13.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A forward converter, comprising:

a power transformer having a primary winding connected in series between a positive input voltage supply line and a first node and a secondary winding connected in parallel across a second node and a third node;

a power switch connected between the first node and a negative voltage supply line;

a first rectifying device connected in series between the second node and a fourth node, and oriented to permit current flow in normal operation between the second node and the fourth node;

a second rectify device connected in parallel across the fourth node and the third node, and oriented to permit current flow in normal operation between the third and fourth nodes;

a first magnetic energy storage element connected in series between the fourth node and a first output node;

a second output node connected to the third node;

a switch connected in a series combination with a second magnetic energy storage element and a capacitive element, the series combination connected in parallel with the primary winding of the transformer; and a circuit for coupling magnetic energy stored in the power transformer to the capacitive element to control the charge level of said capacitive element, including a series combination of an auxiliary winding and a rectifying element, the series combination connected in parallel across the capacitive element.

2. The forward converter of claim 1, wherein said auxiliary winding is magnetically coupled to said power transformer.

3. The forward converter of claim 1, wherein said auxiliary winding is magnetically coupled to said second magnetic storage element.

4. The forward converter of claim 1, wherein the power switch is a MOSFET device.

5. The forward converter of claim 1, further comprising:

an output capacitor connected in parallel across the first and second output nodes.

6. The forward converter of claim 1, further comprising a diode connected in series between said capacitive element and said primary winding, the cathode of said diode coupled to the capacitive element and the anode of said diode coupled to said primary winding.

7. The forward converter of claim 1, further comprising:
a second capacitive element connected in parallel across the power switch to reduce the transient voltage generated when said power switch is turned off, to thereby reduce power switch turn off losses.

8. The forward converter of claim 1, further comprising:
a controller operable to cause the power switch to be turned on when the voltage across the power switch is substantially equal to zero volts.

9. The forward converter of claim 1, wherein the first rectifying device is a synchronous rectifier.

10. The forward converter of claim 9, further comprising an auxiliary winding coupled to the second magnetic energy storage element and configured to control the operation of the first rectifying device.

11. The forward converter of claim 1, wherein the second rectifying device is a synchronous rectifier.

12. The forward converter of claim 11, further comprising an auxiliary winding coupled to the second magnetic energy storage element and configured to control the operation of the second rectifying device.

13. A forward converter, comprising:
a power transformer having a primary winding connected in series between a positive input voltage supply line and a first node and a secondary winding connected in parallel across a second node and a third node;
a power switch connected between the first node and a negative voltage supply line;
a first and a second rectifying device connected at a common node, with both rectifying devices being oriented to permit current flow into the common node in normal operation, and with the ends of the rectifying devices not connected to the common node being connected in parallel across the second and third nodes;
a first magnetic energy storage element connected in series between the common node and a first output node;
a second output node connected to the end of the second rectifying device which is not connected to the common node;
a first switch connected in a series combination with a second magnetic energy storage element and a capacitive element, the series combination connected in parallel with the primary winding of the transformer; and
a circuit for coupling magnetic energy stored in the power transformer to the capacitive element to control the charge level of said capacitive element, including a series combination of an auxiliary winding and a rectifying element, the series combination connected in parallel across the capacitive element.

14. The forward converter of claim 13, wherein said auxiliary winding is magnetically coupled to said power transformer.

15. The forward converter of claim 13, wherein said auxiliary winding is magnetically coupled to said second magnetic storage element.

16. The forward converter of claim 13, wherein the power switch is a MOSFET device.

17. The forward converter of claim 13, further comprising:
an output capacitor connected in parallel across the first and second output nodes.

18. The forward converter of claim 13, further comprising a diode connected in series between said capacitive element and said primary winding, the cathode of said diode coupled to the capacitive element and the anode of said diode coupled to said primary winding.

19. The forward converter of claim 13, further comprising:
a second capacitive element connected in parallel across the power switch to reduce the transient voltage generated when said power switch is turned off, to thereby reduce power switch turn off losses.

20. The forward converter of claim 13, further comprising:
a controller operable to cause the power switch to be turned on when the voltage across the power switch is substantially equal to zero volts.

21. The forward converter of claim 13, wherein the first rectifying device is a synchronous rectifier.

22. The forward converter of claim 21, further comprising an auxiliary winding coupled to the second magnetic energy storage element and configured to control the operation of the first rectifying device.

23. The forward converter of claim 13, wherein the second rectifying device is a synchronous rectifier.

24. The forward converter of claim 23, further comprising an auxiliary winding coupled to the second magnetic energy storage element and configured to control the operation of the second rectifying device.

25. The forward converter of claim 19, further comprising:
an offset switch connected in series between said capacitor and said primary winding, wherein the series combination of said first switch, said second magnetic energy storage element, said capacitor and said offset switch is connected in parallel with said primary winding of the transformer, and wherein said auxiliary winding is magnetically coupled to said second magnetic storage element.

26. The forward converter of claim 25, wherein said first switch is turned on before said power switch goes on and wherein offset switch is on only prior to the turn off of said power switch and remains on until after the turn off of said offset switch.

27. A switching regulator, comprising:
a transformer having a primary winding connected in series between a first node and a first output node and a secondary winding connected between a second node and a third node;
a power switch connected between a positive voltage supply line and the first node;
a switch connected in a series combination with a magnetic energy storage element and a capacitive element, the series combination connected in parallel across the positive voltage supply line and the second node;
a rectifying device connected in series between the second node and a negative voltage supply line and oriented to permit current flow in normal operation between the negative voltage supply line and the second node; and
a second magnetic energy storage element coupled to the first magnetic energy storage element and connected in parallel across the capacitive element.

28. The switching regulator of claim 27, wherein the rectifying device is a synchronous rectifier.

29. The switching regulator of claim 27, wherein the power switch is a FET device.

30. The switching regulator of claim 27, wherein the switch is a FET device.

* * * * *